(12) United States Patent
Preston

(10) Patent No.: US 10,703,591 B2
(45) Date of Patent: Jul. 7, 2020

(54) LOADING PLATFORM

(71) Applicant: John Clement Preston, Silverwater (AU)

(72) Inventor: John Clement Preston, Silverwater (AU)

(*) Notice: Subject to any disclaimer, the term of this patent is extended or adjusted under 35 U.S.C. 154(b) by 0 days.

(21) Appl. No.: 15/772,824

(22) PCT Filed: Nov. 2, 2016

(86) PCT No.: PCT/AU2016/051039
§ 371 (c)(1),
(2) Date: May 2, 2018

(87) PCT Pub. No.: WO2017/075654
PCT Pub. Date: May 11, 2017

(65) Prior Publication Data
US 2018/0354733 A1 Dec. 13, 2018

(30) Foreign Application Priority Data
Nov. 2, 2015 (AU) ................................ 2015904480

(51) Int. Cl.
*B65G 69/22* (2006.01)
*E04G 3/28* (2006.01)
(Continued)

(52) U.S. Cl.
CPC ............... *B65G 69/22* (2013.01); *E04B 1/34* (2013.01); *E04B 1/344* (2013.01);
(Continued)

(58) Field of Classification Search
CPC ..... B65G 69/22; E04B 1/344; E04B 1/34305; E04B 1/34; E04G 21/166; E04G 3/18; E04G 3/28; E04G 2003/286
See application file for complete search history.

(56) References Cited

U.S. PATENT DOCUMENTS 3,520,427 A * 7/1970 Offen ....................... B66F 9/06
414/535
3,679,026 A 7/1972 Hansen et al.
(Continued)

FOREIGN PATENT DOCUMENTS

AU 7456574 A 4/1976
AU 20771/92 A 10/1992
(Continued)

OTHER PUBLICATIONS

International Application No. PCT/AU2016/051039, International Search Report and Written Opinion, dated Jan. 27, 2017.
(Continued)

*Primary Examiner* — Joshua K Ihezie
(74) *Attorney, Agent, or Firm* — Marshall, Gerstein & Borun LLP

(57) ABSTRACT

A loading platform for use in building construction, the loading platform comprising a support structure adapted to be fixed to a building and extend outwardly from the building; and a deck mountable to the support structure such that the deck extends from the building, the support structure being configured such that at least a portion of an upper surface of the support structure extends level with or below a floor surface of the building when fixed to the building.

8 Claims, 21 Drawing Sheets

(51) Int. Cl.
  *E04G 3/18* (2006.01)
  *E04G 21/16* (2006.01)
  *E04B 1/34* (2006.01)
  *E04B 1/343* (2006.01)
  *E04B 1/344* (2006.01)

(52) U.S. Cl.
  CPC ............ *E04B 1/34305* (2013.01); *E04G 3/18* (2013.01); *E04G 3/28* (2013.01); *E04G 21/166* (2013.01); *E04G 2003/286* (2013.01)

(56) References Cited

U.S. PATENT DOCUMENTS

| | | | | |
|---|---|---|---|---|
| 3,876,099 | A | * | 4/1975 | Land .................. B66C 1/16 414/608 |
| 4,444,289 | A | * | 4/1984 | Jungman .............. E04G 21/166 182/36 |
| 5,845,356 | A | * | 12/1998 | Kielinski .............. B65G 69/30 14/69.5 |
| 7,070,020 | B2 | * | 7/2006 | Preston .................. E04G 3/18 182/82 |
| 7,815,014 | B2 | * | 10/2010 | Preston .................. E04G 3/28 182/223 |
| 8,522,922 | B1 | * | 9/2013 | Stokes .................. E04G 3/22 114/353 |
| 9,701,520 | B2 | * | 7/2017 | Pruskauer ............. B66D 1/605 |
| 9,765,536 | B2 | * | 9/2017 | McKeon .............. E04G 21/166 |
| 10,280,637 | B2 | * | 5/2019 | McKeon .............. E04G 21/166 |
| 2003/0029825 | A1 | * | 2/2003 | Baxter, Sr. ........... B66C 23/201 212/179 |
| 2009/0020362 | A1 | * | 1/2009 | Diaz .................. E04G 21/166 182/113 |
| 2012/0006369 | A1 | * | 1/2012 | Cantin ................ E04B 1/34305 135/96 |
| 2015/0152656 | A1 | * | 6/2015 | Mckeon .............. E04G 21/166 414/800 |
| 2018/0223549 | A1 | * | 8/2018 | Snell .................. E04G 21/166 |

FOREIGN PATENT DOCUMENTS

| | | |
|---|---|---|
| AU | 629397 B2 | 10/1992 |
| FR | 2173430 A5 | 10/1973 |
| FR | 2881450 A1 | 8/2006 |

OTHER PUBLICATIONS

International Application No. PCT/AU2016/051039, International Preliminary Report on Patentability (Chapter II), dated Feb. 22, 2018.

European Patent Application No. 16861110.1, Extended European Search Report, dated Sep. 25, 2018.

* cited by examiner

LOADING PLATFORM

TECHNICAL FIELD

This disclosure relates to loading platforms for use in the construction industry.

BACKGROUND ART

Loading platforms are used in construction of e.g. multi-storey buildings to deliver loads to the various levels of the building (i.e. for use in the construction of the building). Generally, each level of the building is provided with a platform that cantilevers from a floor of that level of the building. These platforms are generally positioned directly above one another, because this minimises openings in the building envelope.

To load the uppermost deck, the operator simply needs to position the load on the uppermost deck e.g. using a crane, and then the load can be moved off the deck by workers in the building. However, when the load is to be provided to a lower floor (i.e. below the uppermost floor), any loading platforms positioned above the lower floor will obstruct access by the crane to the lower platform.

Thus, one type of loading platform is provided with rollers to allow it to slide back into the building So, to load a chosen platform, the platforms above the chosen platform are moved (e.g. via a sliding mechanism) back into the building to allow access for the crane to lower the load onto the chosen platform.

One issue with such an arrangement is that the sliding or rolling or sliding mechanism can be heavy and expensive. The significant weight means that, it is more difficult to install the platform, harder to move the platform, a larger support structure is required to support the platform when it is cantilevered, and more load is placed on the floors of the building (especially the floor above the support structure, which is generally not designed for such loading). The sliding mechanism can also present safety issues. For example, when the platform is being installed, workers can forget to lock the sliding mechanism (so as to prevent it from sliding). In such cases, it is possible for the deck of the platform to rapidly slide away from the support structure during installation (i.e. as it is being positioned at the building level by a crane). Any worker in the path of the sliding deck could be seriously injured.

It is to be understood that, if any prior art is referred to herein, such reference does not constitute an admission that the prior art forms a part of the common general knowledge in the art, in Australia or any other country.

SUMMARY

Disclosed is a loading platform for use in building construction, the loading platform comprising a support structure adapted to be fixed to a building and extend outwardly from the building; and a deck mountable to the support structure such that the deck extends from the building, the support structure being configured such that at least a portion of an upper surface of the support structure extends level with or below a floor surface of the building when fixed to the building.

In some forms the loading platform provides an inexpensive option for providing a loading area that is substantially level.

Also disclosed is a loading platform for use in building construction, the loading platform comprising: a support structure adapted to be fixed to a building; and a deck mountable to the support structure and configured to extend from the building, the deck comprising a fixed deck portion and a moveable deck portion, the moveable deck portion being operative to adopt: a first configuration in which the moveable deck portion and the fixed deck portion form a level deck platform, the limits of the level deck platform defining a loading area of the deck; and, a second configuration in which an access path is provided through the loading area of the deck.

The loading platform provides an inexpensive option for providing a platform that is adjustable to allow movement of loads between the loading platform.

Further disclosed is a method of delivering a load to a building, the method comprising the steps of providing a plurality of loading platforms, arranging the loading platforms so as to be generally vertically aligned on a plurality of levels of the building; selecting a loading platform for receipt of the load; moving at least a portion of the deck of the loading platforms above the selected loading platform; and delivering the load to the selected loading platform.

Also disclosed is a loading platform for use in construction, the loading platform comprising: a support structure adapted to be fixed to a building; and a deck for receipt of a load, the deck mountable to the support structure and, comprising a width dimension and a length dimension that is generally orthogonal to and greater than the width dimension; the loading platform being configured such that, in use, the deck is arranged to extend from the building whilst being supported by the support structure, the deck being oriented such that the width dimension of the deck is in the general direction of the extension of the deck.

BRIEF DESCRIPTION OF THE DRAWINGS

Embodiments will now be described by way of example only, with reference to the accompanying drawings in which.

DETAILED DESCRIPTION

Figure 1:
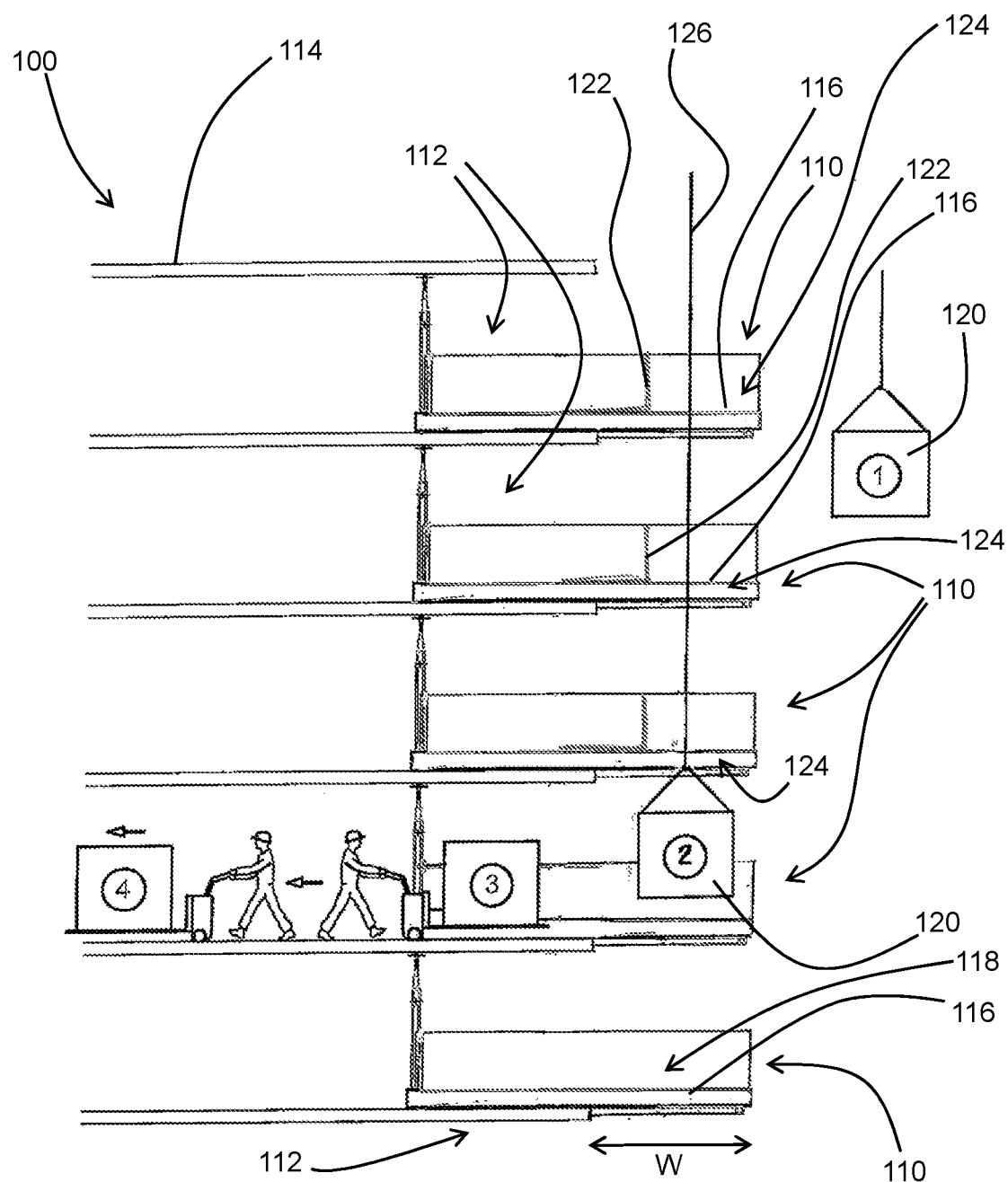
FIG. 1 is a side view of system for delivering a load to a building.

In the following detailed description, reference is made to accompanying drawings which form a part of the detailed description. The illustrative embodiments described in the detailed description, depicted in the drawings and defined in the claims, are not intended to be limiting. Other embodiments may be utilised and other changes may be made without departing from the spirit or scope of the subject matter presented. It will be readily understood that the aspects of the present disclosure, as generally described herein and illustrated in the drawings can be arranged, substituted, combined, separated and designed in a wide variety of different configurations, all of which are contemplated in this disclosure.

Disclosed is a loading platform for use in building construction, the loading platform comprising a support structure adapted to be fixed to a building and extend outwardly from the building; and a deck mountable to the support structure such that the deck extends from the building, the support structure being configured such that at least a portion of an upper surface of the support structure extends level with or below a floor surface of the building when fixed to the building.

In some forms the loading platform provides a generally level surface extending from the floor of the building out beyond the periphery of the building. The obstacles and hazards are reduced which has safety benefits and benefits in cost of moving equipment.

In some forms the support structure comprises a building engagement portion and a deck support portion, the deck support portion extending outwardly from the floor of the building, an upper surface of the deck support portion being level with or lower than the floor surface of the floor of the building.

In some forms the entire deck support portion of the support structure is configured to be located level with or below the floor surface.

In some forms the support structure is configured such that a lower surface of the building engagement portion overlays the floor surface.

In some forms the building engagement portion and the deck support portion are connected.

In some forms the support structure extends vertically between the building engagement portion and the deck support portion.

In some forms the building support structure is stepped between the building engagement portion and the deck support portion.

In some forms the building engagement portion is welded with the deck support portion. In some forms the welding is a full structural weld. In some forms strengthening members are provided to strengthen the join.

In some forms the building engagement portion extends across a floor surface of the building and outwardly of the floor of the building and the deck support portion is affixed to a lower surface of the building engagement portion that overhangs an edge of the floor of the building.

In some forms the building engagement portion comprises a beam which engages the floor surface of the building and the deck support portion comprises a beam which engages the building engagement portion such that the deck support portion is lower than the building engagement portion.

In some forms the platform is provided as a module for a loading platform assembly and configured such that a plurality of platforms can be located adjacent one another to form the loading platform assembly.

Also disclosed is a loading platform for use in building construction, the loading platform comprising: a support structure adapted to be fixed to a building; and a deck mountable to the support structure and configured to extend from the building, the deck comprising a fixed deck portion and a moveable deck portion, the moveable deck portion being operative to adopt a first configuration in which the moveable deck portion and the fixed deck portion form a level deck platform, the limits of the level deck platform defining a loading area of the deck; and a second configuration in which an access path is provided through the loading area of the deck.

In some forms in the first configuration the moveable portion extends substantially in line with the fixed deck portion and in the second configuration the moveable portion extends transverse to the fixed deck portion.

In some forms the moveable deck portion is turned out of alignment with the fixed deck portion through approximately 90 degrees to extend upwardly with respect to the fixed deck portion.

In some forms the moveable portion may comprise the whole deck.

The access path may provide access through the loading area by a crane rope and/or a load. In some forms by only providing a portion that is movable, the weight and cost of the loading platform can be reduced (in comparison to those arrangements where the entire deck slides into the building). This reduction in weight also means it is faster and easier for a worker to form an access path through the loading area.

Also disclosed herein is a loading platform for use in building construction. The loading platform comprises a support structure adapted to be fixed to a building, and a deck mountable to the support structure and configured to extend from the building. The deck is operative to adopt first and second configurations. In the first configuration the deck defines a loading area for receiving a load. In the second configuration, a movable portion of the deck is displaced to provide an access path through the loading area.

In one embodiment the movable portion may be supported on the deck when in the second configuration. In this way, space in the building is not taken up by the deck (or a portion of the deck) when in the second configuration.

In one embodiment the access path may be at a distal edge of the deck.

In one embodiment the movable portion may be slideable relative to the deck. This sliding may be enabled by wheels, tracks, rails, etc.

In one embodiment the movable portion may be pivotable relative to the deck. The movable portion may comprises multiple parts pivotable relative to one another and the deck. That is, the movable portion may displace in a folding manner. Alternatively, the movable portion may swing (inwardly or outwardly) like a door.

In one embodiment the loading platform may comprise a sidewall extending around the perimeter of the deck. This may provide a safety barrier for workers, and may also prevent materials from falling from the deck. One or more portions of the sidewall (e.g. at a distal edge of the deck) may be configured to be removed or displaced (e.g. by hinging) to allow easier access to the loading area (by a load).

In one embodiment the movable portion may form a part of the sidewall in the first configuration.

In one embodiment the movable portion may form a part of the sidewall in the second configuration.

In one embodiment the loading platform may further comprises one or more doors moveable between a first retracted position, and a second position in which the one or more doors extend between the sidewall and the retractable position. This may provide a (continuous) safety barrier for workers when the loading platform is in the second configuration. The doors may be hingedly connected to the sidewall.

In one embodiment the access path may be adapted to provide access to a crane rope through the envelope of the loading area.

In one embodiment the deck may be mountable at a floor of the building such that the deck is generally coplanar with the floor. As set forth above, this may avoid the need for a large ramp that takes up space in the building. For example, the deck may be level with the floor, or may be 6 to 12 mm above the floor when mounted thereto.

Also disclosed herein is a loading platform comprising a support structure adapted to be fixed to a building, and a deck mountable to the support structure and configured to extend from the building. The deck comprises a cut-out at an edge thereof to provide an access path through the deck.

The cut-out may be sized and located to allow a load to span the cut-out (i.e. being supported either side of the cut-out) when received on the deck. For example, the cut-out may be generally central to the distal edge of the deck and may only extend along that edge for a length that is shorter than the length of the load (to allow the load to extend across the cut-out).

In one embodiment the cut-out may be at a distal edge of the deck.

In one embodiment the cut-out may be adapted to provide access to a crane rope.

Also disclosed herein is a method of delivering a load to a building. The method comprises the steps of providing a plurality of loading platforms as defined above. The method further comprises arranging the loading platforms so as to be generally vertically aligned on a plurality of levels of the building; selecting a loading platform for receipt of the load; retracting the movable portions of the loading platforms above the selected loading platform; and delivering the load to the selected loading platform.

In some forms, the platform (in any form described above) is provided as a module for a loading platform assembly and configured such that a plurality of platforms can be located adjacent one another to form the loading platform assembly. In some forms, when a plurality of loading platforms are positioned adjacent one another, the decks and support structure forms a substantially level deck area extending across each of the plurality of loading platforms.

Also disclosed is a loading platform assembly comprising a plurality of loading platforms located adjacent one another.

In one form the decks and support structures of the loading platforms in the assembly form a substantially level deck area extending across each of the plurality of loading platforms.

In some forms, the loading platform assembly has a width dimension and a length dimension that is generally orthogonal to and greater than the width dimension; the loading platform assembly being configured such that, in use, the deck of the assembly is arranged to extend from the building whilst being supported by the support structure, the deck being oriented such that the width dimension of the deck is in the general direction of the extension of the deck.

Disclosed herein is a loading platform for use in construction. The loading platform comprises a support structure adapted to be fixed to a building, and a deck for receipt of a load. The deck is mountable to the support structure and, comprises a width dimension, and a length dimension that is generally orthogonal to and greater than the width dimension. The loading platform is configured such that, in use, the deck is arranged to extend from the building whilst being supported by the support structure. The deck is oriented such that the width dimension of the deck is in the general direction of the extension of the deck.

By orienting the deck in this way, the distance that the deck cantilevers may be reduced. This may reduce the load that is passed from the deck to the support structure, and subsequently from the support structure to the building.

In one embodiment the deck may be fixed relative to the support structure. That is, the deck may not have a sliding mechanism to enable it to slide back into the building. This may reduce the weight and complexity of the loading platform.

In one embodiment the support structure may be mounted to a floor of the building.

In one embodiment the support structure may be mounted between two floors of the building.

In one embodiment the deck may be adapted to receive a load oriented to be generally parallel to the building.

In one embodiment the deck may be mountable at a floor of the building such that the deck is generally coplanar with the floor. This may avoid the need to provide a ramp to access the deck from the building. Whether there is a significant difference in the elevation of the deck and the building a relatively long ramp may be required to provide access to the deck. This can take up valuable space in the building.

FIG. 1 shows a system 100 comprising a plurality of loading platforms 110 arranged so as to be generally vertically aligned on a plurality of levels of a building 114. Each loading platform 110 comprises a support structure 112 adapted to be fixed to the building 114, and a deck 116 mountable to the support structure 112. Each deck 116 has a width dimension W and a length dimension (not apparent from the figure) that is greater than the width dimension W. The decks 116 are arranged so as to extend (e.g. cantilever) from a side of the building 114 whilst being supported by the support structure 112. Each deck 116 is oriented such that the width dimension W is in the direction of the extension of the deck 116 and the length dimension L is generally transverse to the side of the building 114. That is, the decks 116 are oriented so as to be generally parallel to the facade (that the decks 116 cantilever from) of the building 114.

Each deck 116 is operative to adopt first and second configurations. In the first configuration, the deck 116 defines a loading area 118 for receiving a load 120. In the second configuration a movable portion 122 of the deck 116 is retracted to provide an access path 124 through (e.g. an envelope of) the loading area 118.

As is shown in the FIG. 1, a load 120 may be delivered to a lower level of the building 114 (e.g. any level but the uppermost level), without having to slide each of the upper platforms 110 back into the building 114. The platforms 110 shown in FIG. 1 are incapable of sliding, and do not comprise any mechanism that enables the entire platform 110 to be moved into the building 114. That is, the deck 116 is fixed relative to the support structure 112 when mounted thereto. So, to allow access, e.g. by a crane, to lower loading platforms 110, the loading platforms 110 instead comprises a portion which is movable (i.e. the movable portion 122).

In use, the movable portions 122 of each upper platform 110 (i.e. those platforms 110 above the platform 110 at which the load 120 is to be delivered—the 'delivery level') are retracted. The opening or access path 124 in the loading area 118, created by displacing of the movable portion 122, is sized and shaped to allow space for a rope 126 of a the crane. Hence, for example, the load 120 may be lowered by the crane (to the delivery level) along an axis that is beyond the distal ends of the loading platforms 110, and the load 120 may be subsequently moved laterally towards the building 114 such that the rope 126 passes into the access path 124 (formed by retraction of the movable portions 122) of each upper platform 110. The load 120 can then be positioned in the loading area 118 of the deck 116 of the delivery level loading platform 110, and can then be handled by workers located at that level (e.g. by hand, using trolleys, pallet jacks, forklifts, etc.)

Figures 2A, 2B:
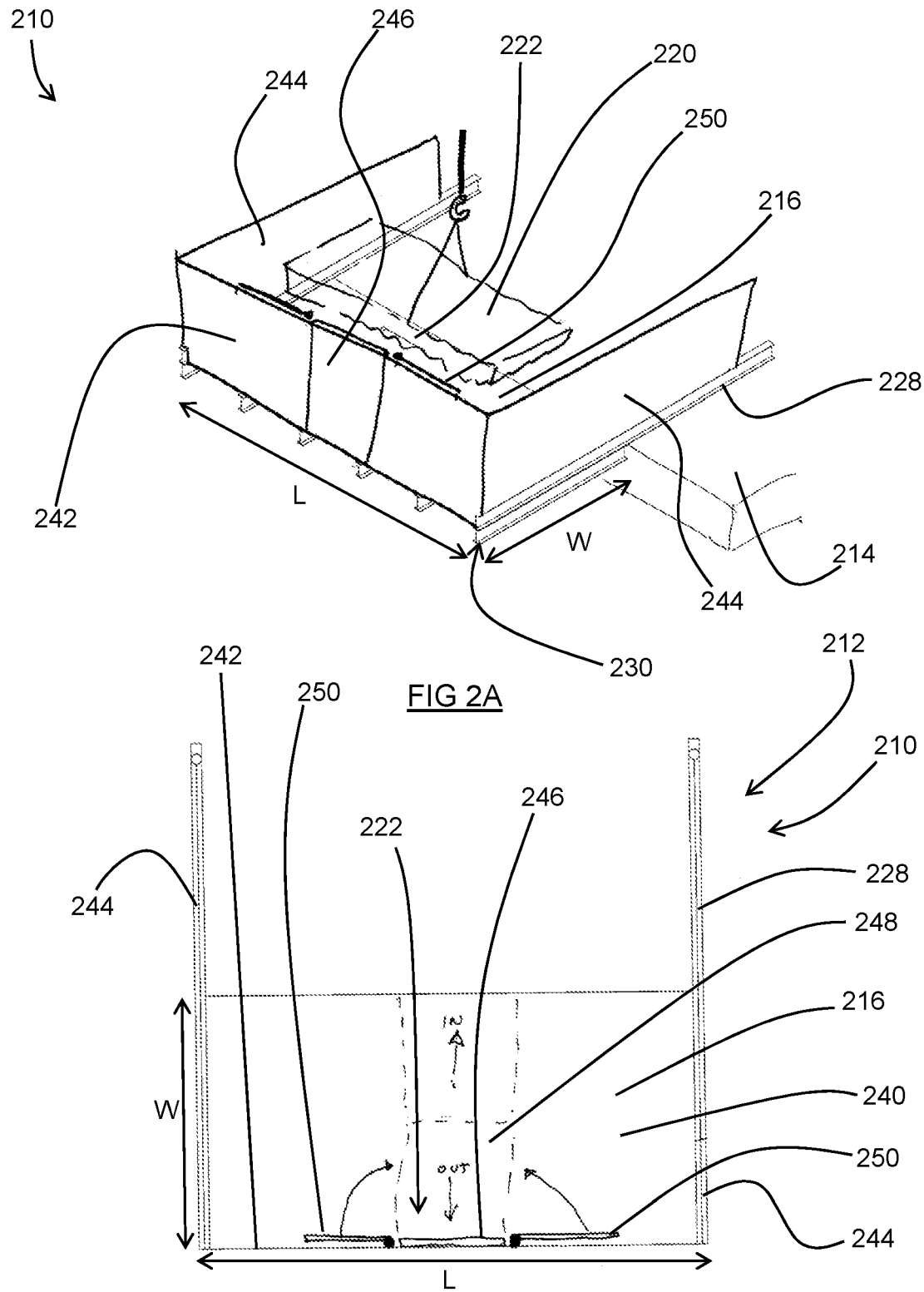
FIGS. 2A and 2B are a perspective view and a top view of a first embodiment of loading platform in a first configuration.

An embodiment of the loading platform 210 is shown in more detail in FIGS. 2A, B, C and D. The platform 210 comprises a support structure 212 adapted to be fixed to a building 214, and a deck 216 mounted to the support structure 212 and configured to cantilever from the building 214.

Figure 2C:
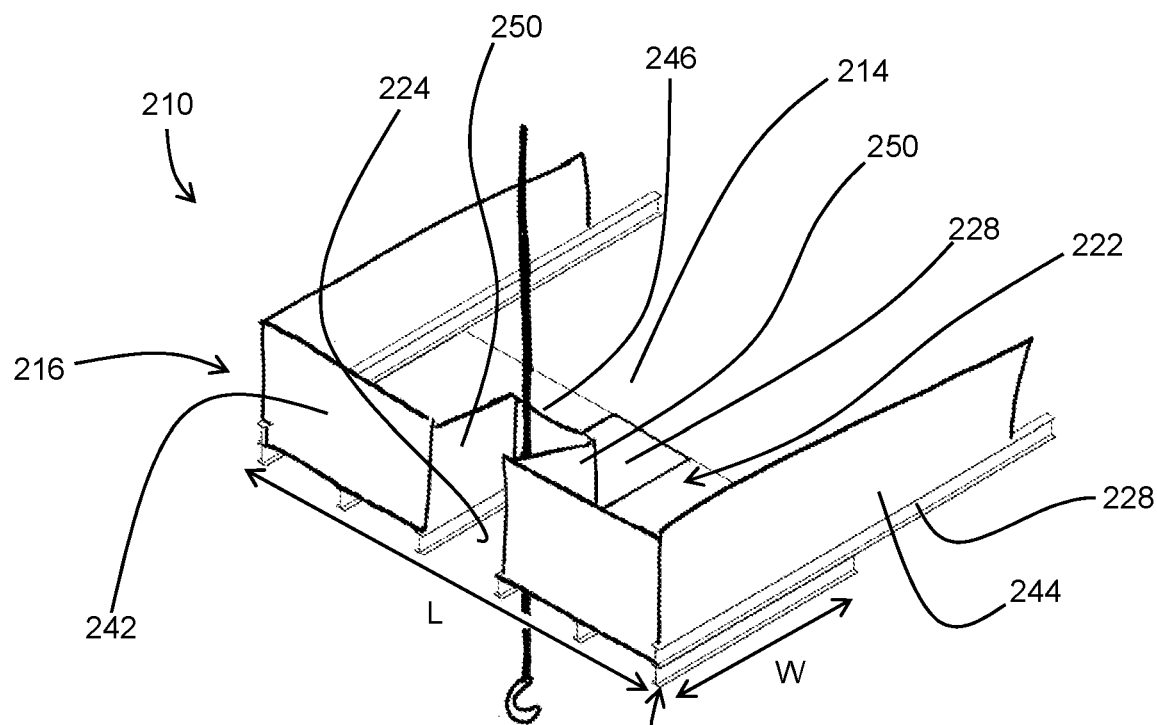
FIGS. 2C and 2D are a perspective view and a top view of a first embodiment of loading platform in a second configuration.
Figure 2D:
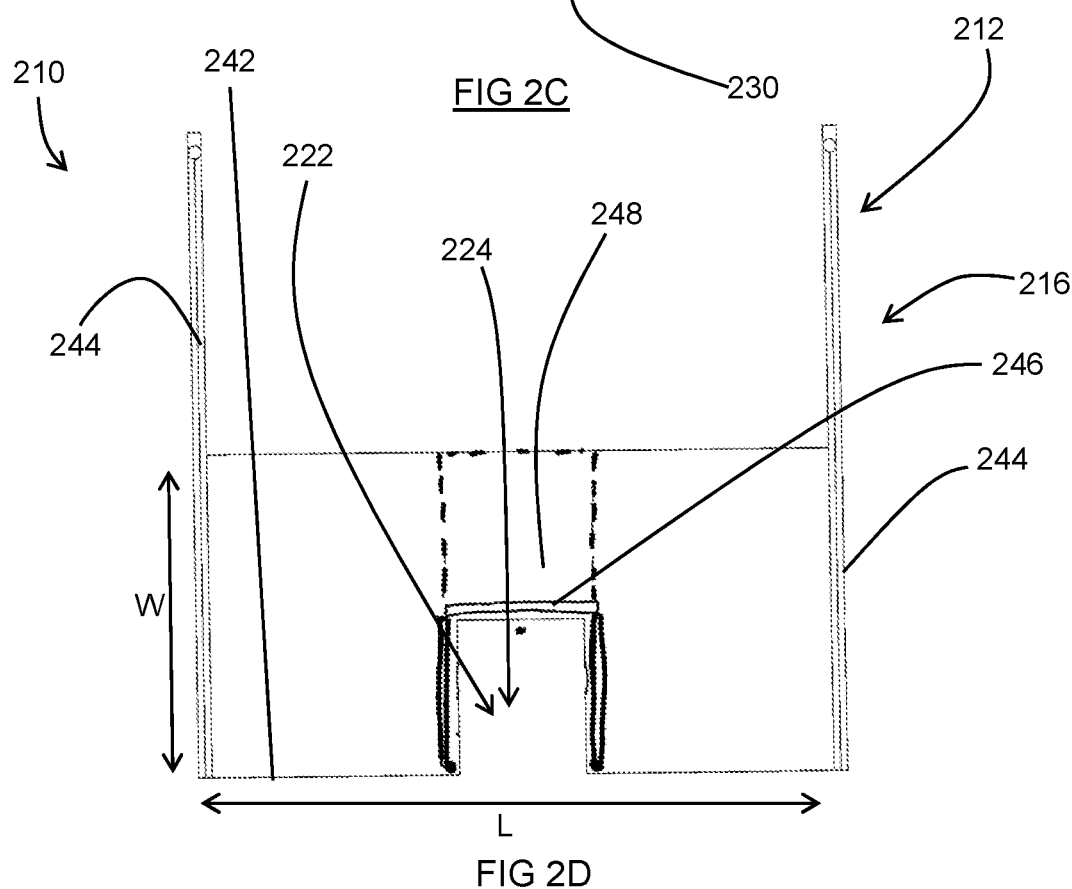
Figure 2E:
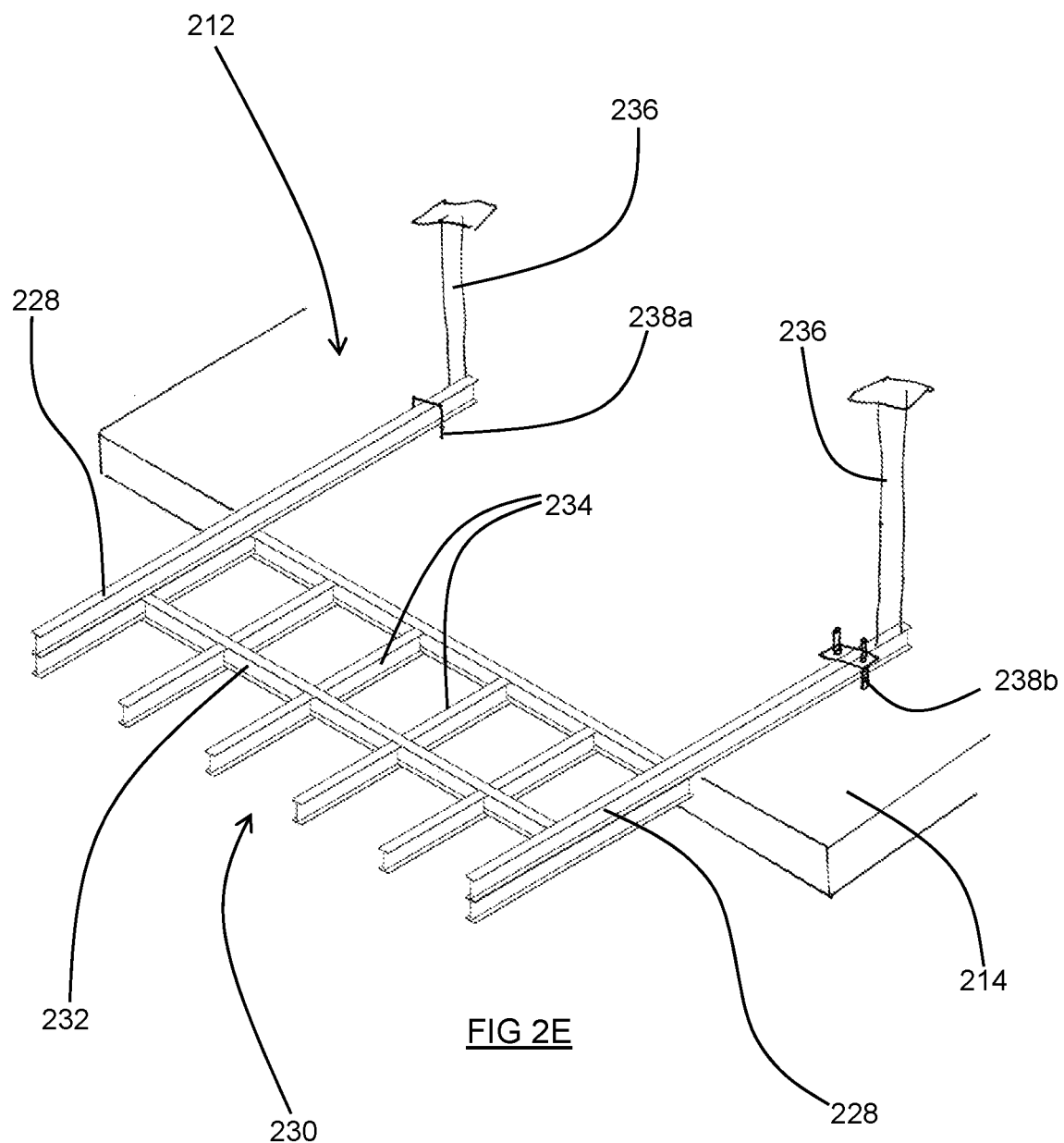
FIG. 2E is a perspective view of a support structure of the first embodiment.

The support structure 212 is shown alone (i.e. without the deck 216) in FIG. 2E, and comprises two, spaced apart, substantially parallel rolled steel joists 228 that extend in a direction that is generally perpendicular to the edge of the floor of the building 214. A portion of each of these joists 228 extends from the edge of the building 214 so as to cantilever from the floor of the building 214. A framework of longitudinal 232 and transverse 234 beams is fixed (e.g. welded or bolted) to the undersides of, and between, the cantilevered portions of the joists 228 so as to provide a base structure 230 for the deck. In use, an inner side (facing the building 214) of the base structure 230, formed of a longitudinal beam 232, abuts against an outer edge of the floor of the building 214. Such an arrangement means that the upper surface of the deck 216 (when affixed to the base structure 230) is generally in the same plane as the upper surface of the floor of the building 214 and any gap between the building 214 and the deck 216 is minimised.

A prop 236 is fixed to the proximal end (inside the building) of each joist 228. Each prop 226 extends between the end of the joist 228 and the lower surface of the floor above. Downforce created by the weight of the cantilevered deck 216 (and any load on the deck 216) transferred upwards through the props 236 to the upper floor. The props 236 may be telescopic screw jacks, hydraulic cylinders, or some other means for transferring load to the upper floor. Some of this load may additionally or alternatively transferred downwards to the floor of the building 214 on which the support structure 212 is located. This portion of the load may be transferred by stirrups 238a or bolts 238b that mount the joists 228 to the floor of the building 214. Stirrups 238a or bolts 238b may be used, for example, where there is no upper floor (e.g. at the roof). Thus, these may be used as an alternative to props 236.

Returning to FIGS. 2A, B, C and D, the deck 216 comprises length L and width W dimensions; the length dimension L being greater than the width dimension W. As is evident from the figures, the orientation of the deck 216, in use, is such that the width dimension W is in the direction of the extension of the deck 216 from the building 214, and the length dimension L (orthogonal to the width dimension W) is generally transverse to the side of the building 214.

As set forth above, the deck 216 is operative to adopt first and second configurations. In the first configuration, shown in FIGS. 2A and 2B, the deck 216 defines a loading area for receiving a load 220. The loading area comprises a generally rectangular envelope and, for the most part, provides an extension of the floor of the building 214 to allow delivery of the load 220 from above by e.g. a crane. For the purpose of receiving such loads 220, the deck 216 comprises a generally planar base 240 (e.g. formed of sheet metal) that is affixed to the base structure 230 of the support structure 212.

For safety, the deck 216 also comprises an end wall 242 (extending across a distal end of the deck 216) and two parallel sidewalls 244. The sidewalls 244 extend along the joists 228 of the support structure 212 and into the building 214. In the illustrated form, these walls 242, 244 are formed of sheet metal, but may be formed of other suitable materials, such as steel mesh or netting (which may further reduce the weight of the platform).

The deck 216 further comprises a movable portion 222 in the form of an L-shaped structure having vertical 246 and horizontal parts 248. In the first configuration, the vertical part 246 of the movable portion 222 forms a central section of the end wall 242 of the deck 216. The horizontal part 248 of the movable portion 222 forms a portion of the base 240 of the deck 216. The movable portion 222 is slideably engaged with the base 240 of the deck 216 such that it can be retracted from its position in the first configuration to its position in the second configuration. This engagement may be in the form of rollers, a sled-type arrangement (i.e. making use of low friction surfaces), wheels, rails, etc. The movable portion 222 may alternatively be configured to slide laterally.

In the second configuration, shown in FIGS. 2C and 2D, the movable portion 222 of the deck 216 is retracted (e.g. by sliding) to provide an access path 224 through the deck 216 (i.e. through the envelope of the loading area defined by the deck 216) at a generally central portion of its distal edge. Thus, the horizontal part 248 of the movable portion 222 overlies (and is supported by) the deck 216, and the vertical portion 246 is offset from the end wall 244 of the deck 216. The positioning of the movable portion 222, and the spacing of the framework of the base structure 230 is such that a gap is formed in the deck in the second configuration (i.e. which, in the first configuration, is covered by the horizontal part 248 of the movable portion 222). This gap is somewhat provided by the spacing of the transverse members 234 of the base structure 230. The gap provides the access path 224 through the deck 216, and is shaped and sized for receipt of the rope 226 of a crane (or another hoisting device).

For safety reasons, the deck 216 further comprises doors 250 positioned either side of the movable portion 222. The doors 250 are hingedly connected to the end wall 242 of the deck 216, such that in the second configuration they can be hinged to extend across the gaps formed between the end wall 242 and the vertical part 246 of the movable portion 222. The deck may be provided with locking assemblies to lock the doors 250 in position in the first and/or second configurations (i.e. when pivoted across the gaps and when positioned so as to be parallel to the end wall 242 of the deck 216).

As set forth above, the gap formed in the deck 216 (providing the access path 224) is sized and shaped such that the access is provided to the rope 226 of a crane or hoist device. Thus, the entire platform 210 does not need to be retracted into the building 214, and the resulting structure is able to be lighter whilst being more rigid (because there is no need for a substantial sliding mechanism).

Figure 3A:
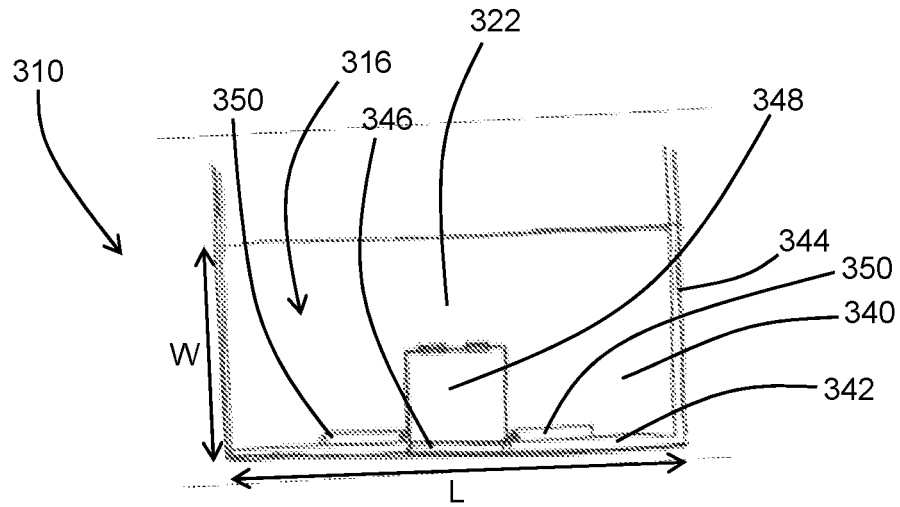
FIGS. 3A, 3B and 3C are top view of a second embodiment of a loading platform.
Figure 3B:
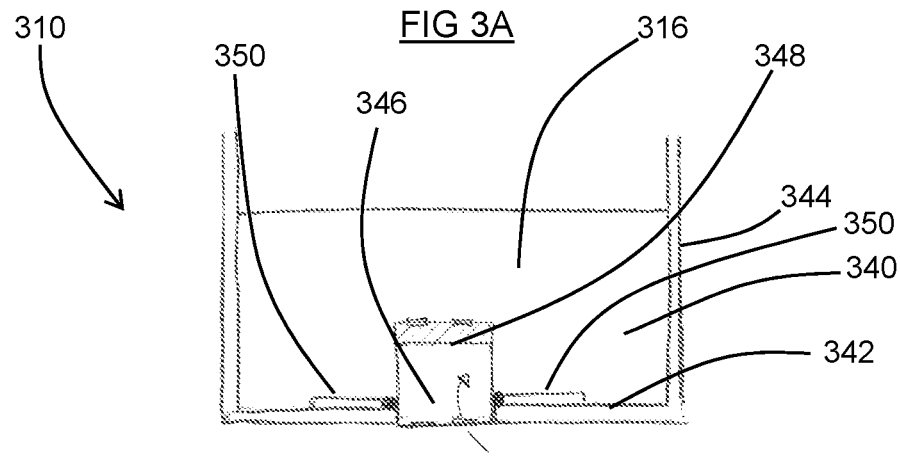
Figure 3C:
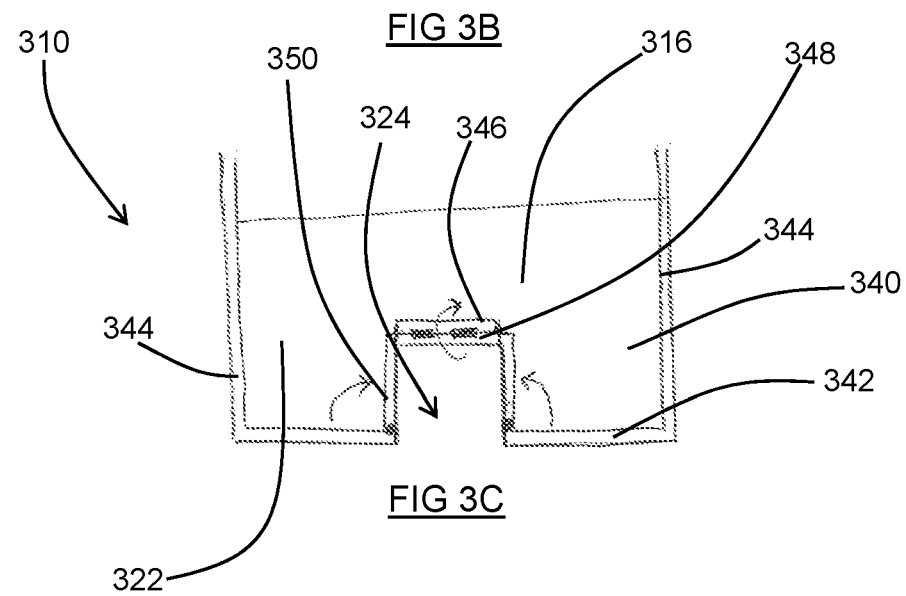

A further embodiment of the platform 310 is shown in FIGS. 3A, B and C. In this embodiment, the movable portion 322 is movable by way of a folding mechanism, rather than by way of slidable engagement with the deck 316. The movable portion 322 comprises a horizontal part 348 and a vertical part 346 hingedly connected to one another. The horizontal part 348 is hingedly connected to the base 340 of the deck 316. To retract the movable portion 322, the vertical part 346 is hinged so as to fold back onto (i.e. so as to overlie) the horizontal part 348 of the movable portion 322 (as shown in FIG. 3B). The horizontal part 348 is then folded upwards about its hinged connection with the deck 316, such that both the horizontal 348 and vertical 346 parts are oriented generally vertically (i.e. forming a wall of the deck 316), as is shown in FIG. 3C. Like the previously described embodiment, hinged doors 350 are provided and can be pivoted so as to extend across the gaps between the end wall 342 of the deck and the wall formed by the movable portion 342. Locking assemblies may be provided to lock the various components in their respective positions in the first and second configurations. Other versions of the foldable mechanism may fold laterally (i.e. rather than toward the building).

Figure 4:
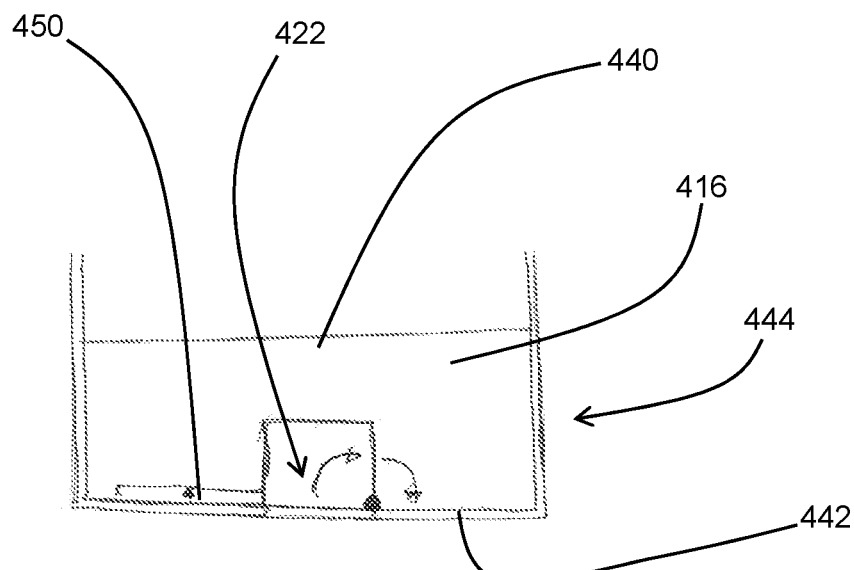
FIG. 4 shows a third embodiment of a loading platform.

The embodiment shown in FIG. 4 is similar to that shown in FIGS. 2A, B, C, D and E, except that the movable portion 422 is hinged to the end wall 442 of the deck 416 and pivots to provide the access path 424 through the deck 416. In this case, the door 450 (hingedly connected to the end wall) comprises two hingeably and laterally connected parts, which provide walls for two sides of the access path gap in the deck 416 in the second configuration. The vertical part of the movable portion, in the second configuration, is perpendicular to the end wall 442 and extends across the gap between the door 450 and the end wall 442.

Figure 5:
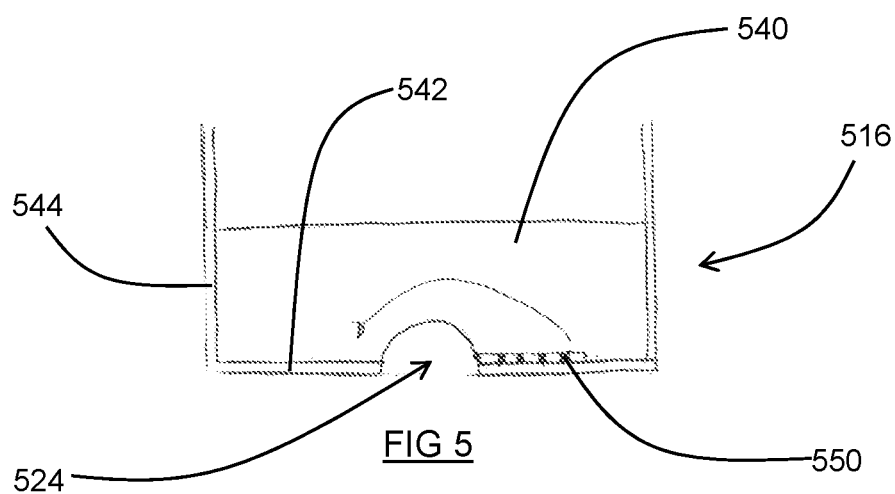
FIG. 5 shows a fourth embodiment of a loading platform.

The embodiment shown in FIG. 5 does not comprise a movable portion. Rather, it comprises an access path 524 that is always open. This access path 524 in the form of a semi-circular cut-out in the deck 516 that is sized so that when a load 520 is delivered to the loading area of the deck 516, it spans the access path 524 (i.e. it is supported either side of the gap). This embodiment is lighter, less complex, and cheaper than those described above, but may not be suitable for receipt of materials or loads 520 that are not large enough to span across the cut-out formed in the deck 516. Again, the deck 516 is provided with a door 550 that can be pivoted so as to extend along the perimeter of the access path 524 formed in the deck 516. Due to the semi-circular shape of the cut-out, the door 550 is provided with multiple hinged segments that allow it to follow the curved perimeter of the cut-out. In other embodiments, the door 550 may be formed of a flexible material so as to allow it to more closely follow the curve.

Figure 6:
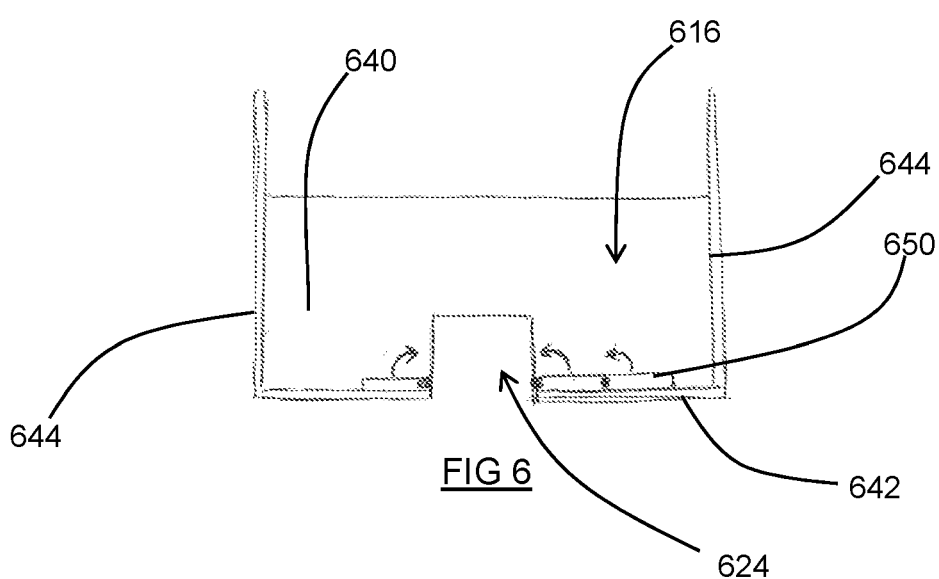
FIG. 6 shows a fifth embodiment of a loading platform.

The embodiment shown in FIG. 6 is a variation of that shown in FIG. 5. Rather than a semi-circular cut-out, the deck 616 comprises a rectangular cut-out (providing the access path 624). Two doors 650 are provided, either side of the cut-out, to extend around the perimeter of the cut-out in the second configuration. One of the doors 650 has a central hinge, which allows it to extend around two sides of the rectangular cut-out.

A further embodiment of the loading platform 710 is shown in FIGS. 7-12. The platform 710 comprises a support structure 712 adapted to be fixed to a building 714, and a deck 716 mounted to the support structure 712 and configured to cantilever from the building 714.

The support structure 712 comprises two, spaced apart, substantially parallel supports 718 that extend in a direction that is generally perpendicular to the edge of the floor of the building 714. A deck support portion 720 of each of these supports 718 extends from the edge of the building and beyond the floor of the building 714. A building engagement portion 722 of the supports 718 extends along the floor of the building 714 to brace the support structure 712 in position with respect to the building. The deck support portion 720 is engaged with the building engagement portion 722. In some forms this engagement is by means of welding. In some forms this comprises a full structural weld. The engagement area 724 is configured to create a stepped or dog's leg shape in the support such that each support 718 extends horizontally at the building engagement portion 720, turns to the vertical at the engagement area 724 for the combined width of the support portions 720 and 722 and then extends horizontally from the engagement area into the deck support portion. The engagement area 724 is welded to secure the deck support portion 720 and the building engagement portion 722 in relation to one another.

In some forms in which the deck support portion 720 and building engagement portion 722 are in the form of I-beams, the I-beam is made up of two flanges connected by a web located centrally on the flange. The lower flange of the building engagement portion 722 is welded to the upper flange of the deck support portion 720. The structural weld connects both sides of the I-beam at either edge of the flange.

In some forms in which the deck support portion 720 and building engagement portion 722 are in the form of C-beams, the C-beam is made up of two flanges connected by a web at one end of the flanges. The lower flange of the building engagement portion 722 is welded to the upper flange of the deck support portion 720. The structural weld connects both sides of the C-beam at either edge of the flange.

In some forms a gusset is provided to add strength to the engagement area 724. In some forms the gusset comprises a panel or plurality of panels closing off one end of the beam. In some forms, the engagement area 724 includes one or more flanges or strengthening projections to strengthen the support 718.

The form of the support 718 means that the deck support portion 720 can extend from the floor of the building 714 such that an upper surface of the deck support portion 720 is aligned with or lower than the floor surface while the building engagement portion 722 is raised above the floor surface and in a facing relationship with the floor surface.

A deck 716 that is support by the deck support portion 720 is therefore level with the floor surface of the building 714. This has the benefit of allowing movement between the floor of the building 714 and the deck 716 without endangering a user or requiring special equipment or lifting.

Figure 7:
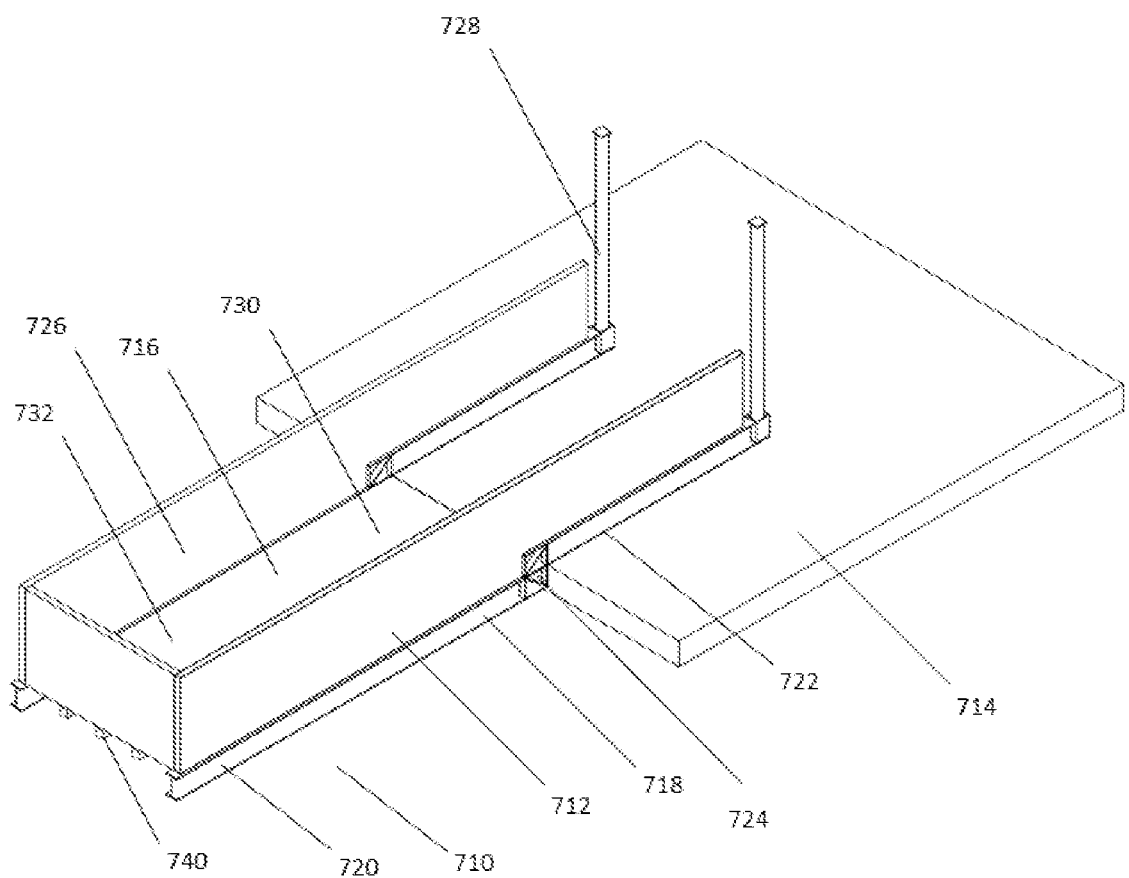
FIG. 7 shows a perspective view of a sixth embodiment of a loading platform.
Figure 9:
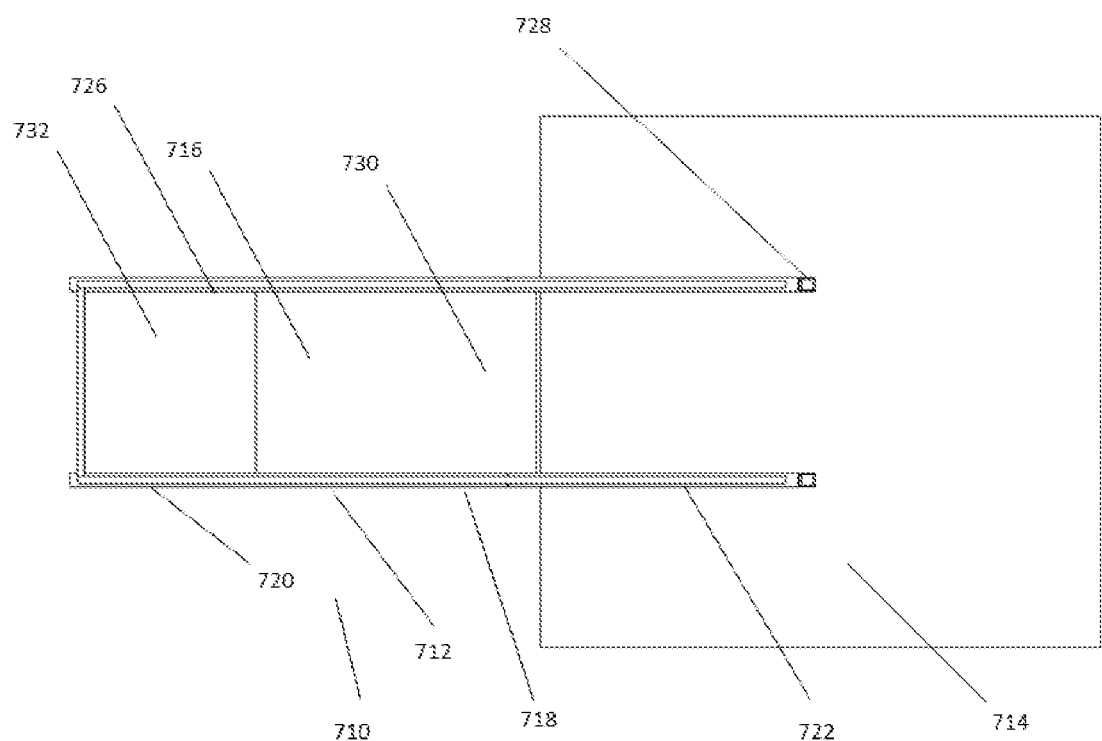
FIG. 9 shows a top view of the loading platform of FIG. 7.
Figure 11:
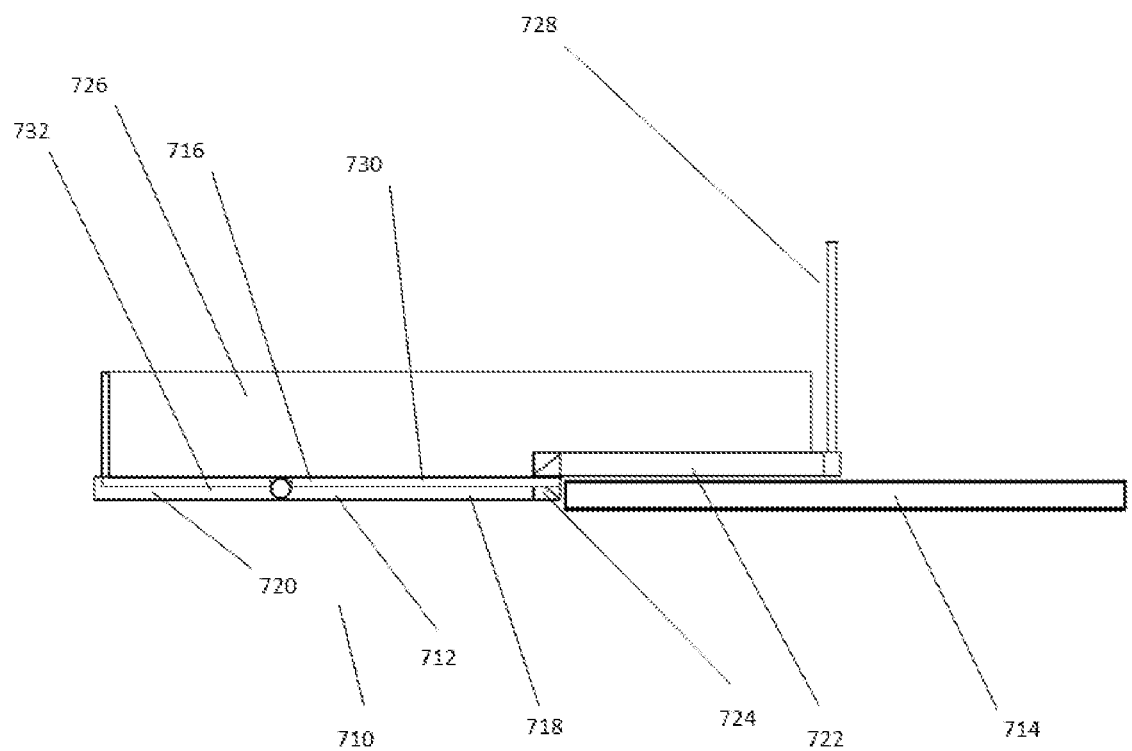
FIG. 11 shows a side view of the loading platform of FIG. 7.

The deck 716 comprises a fixed deck portion 730 and a moveable deck portion 732. The moveable deck portion is moveable between two configurations. In the first configuration as shown in FIGS. 7, 9, and 11 the moveable deck portion extends outwardly from the fixed deck portion 730. The moveable deck portion 732 is engaged with and level with the fixed deck portion. The fixed deck portion and moveable deck portion form a level deck platform extending the full upper surface area of the deck 716. The limits of the level deck platform define a loading area of the platform.

Figure 8:
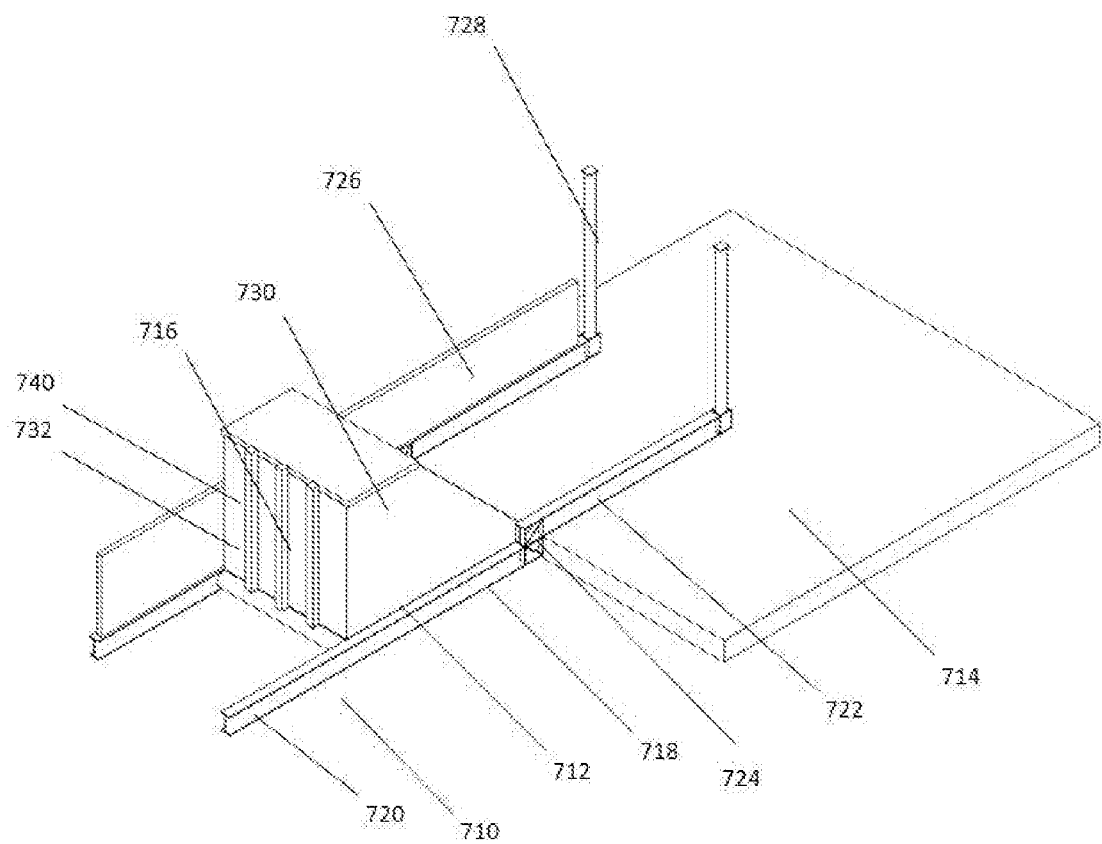
FIG. 8 shows a perspective view of the loading platform of FIG. 7, in a lifted configuration.
Figure 10:
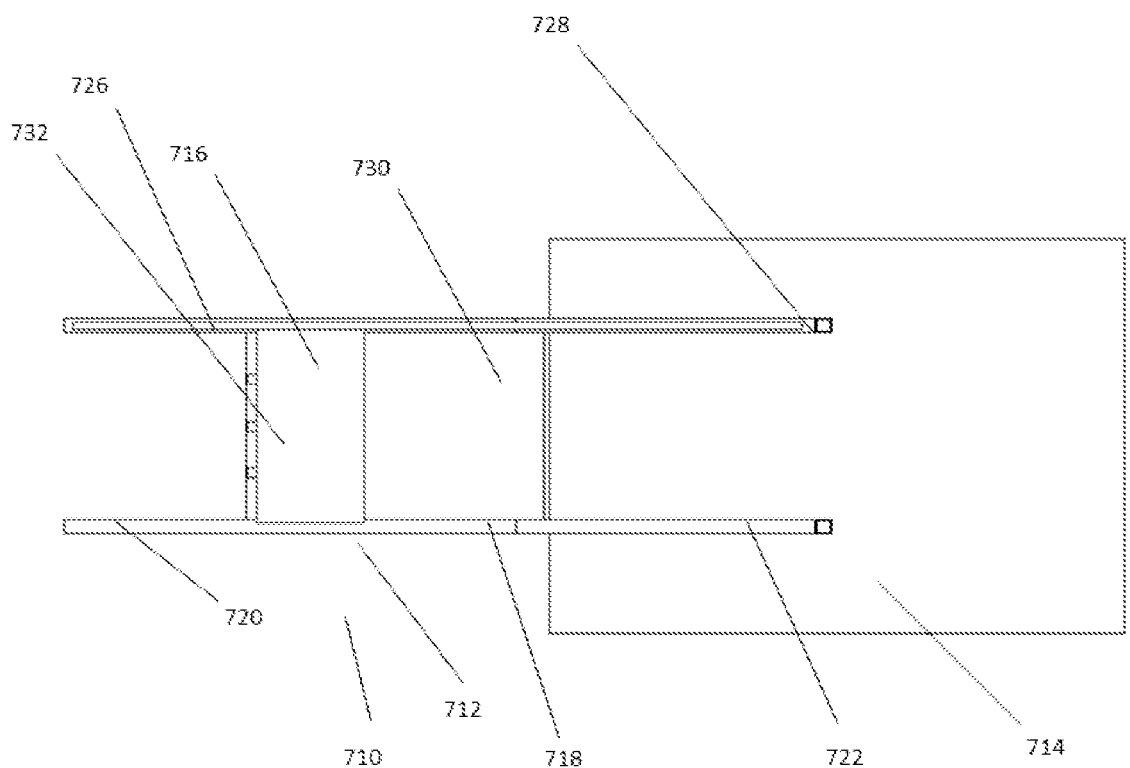
FIG. 10 shows a top view of the loading platform of FIG. 7, in a lifted configuration.
Figure 12:
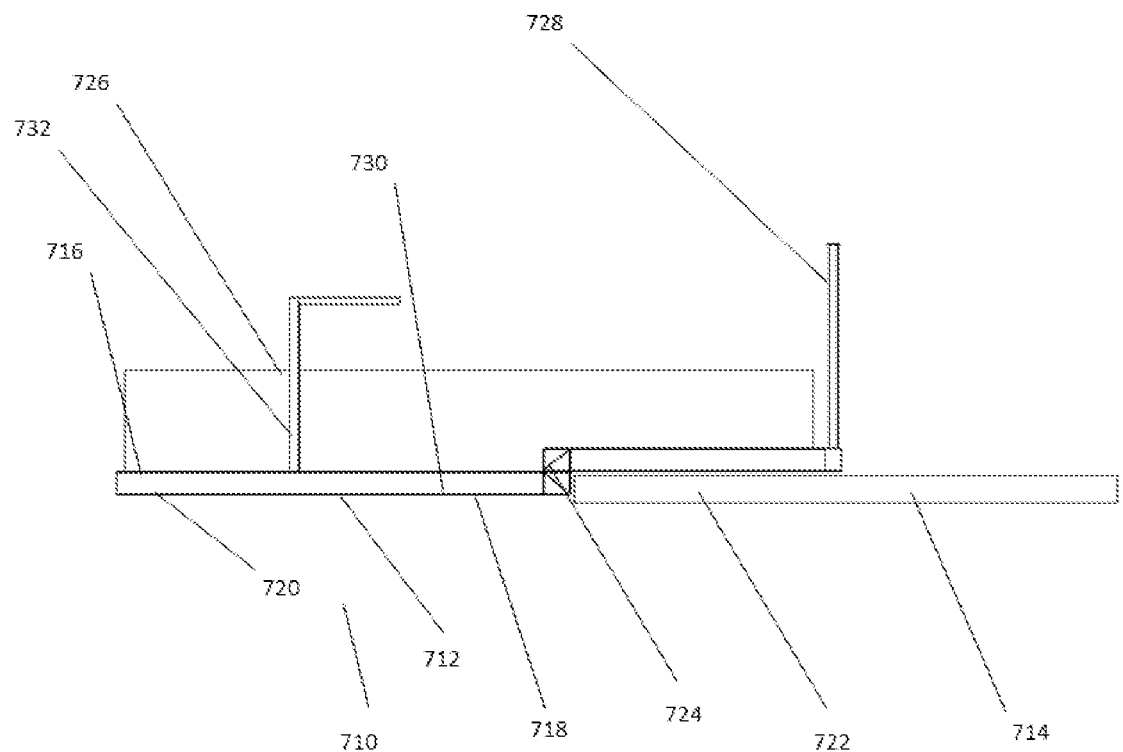
FIG. 12 shows a side view of the loading platform of FIG. 7, in a lifted configuration.

The moveable deck portion 732 is moveable into a second configuration as best shown in FIGS. 8, 10 and 12. In this configuration the moveable deck portion 732 is turned to a vertical orientation such that it is vertical to the fixed deck portion 730. The entire moveable deck portion is rotatable through 90 degrees to the vertical to be in a perpendicular relationship with the fixed deck portion 730.

The movement into the second configuration moves the moveable deck portion 732 away from the loading area and creates an opening in the loading area of the platform 710. The moveable portion of the deck also forms a section of wall to prevent accidents.

A railing 726 in the form of sheet material extends along the edges of the deck 716.

The supports 718 are engaged with the building 714 by means of a joining element such as a detachable prop 728 which engages an end of the building engagement portion 720 furthest to the interior of the building floor and distal from the deck support portion 720. In use the prop 728 extends between the end of the support 718 and the lower surface of the floor above.

A framework of struts 740 is fixed (e.g. welded) to the undersides of the deck 716 so as to provide a base structure for the deck.

In use, movement of the moveable deck portion 732 into the second configuration provides an access path through the deck 716 (i.e. through the envelope of the loading area defined by the deck 716) at a portion of its distal edge.

The gap formed in the deck 716 provides an access path 744 sized and shaped such that the access is provided for a crane or hoist device. Thus, the entire platform 710 does not need to be retracted into the building 714, and the resulting structure is able to be lighter whilst being more rigid (because there is no need for a substantial sliding mechanism).

FIGS. 13 through 19 show a combination platform 810. In this form the platform 810 comprises a support structure 812 adapted to be fixed to a building 814. In this form, a plurality of platforms 811 are utilised in a modular set up. The modular set up allows for a user to select a size of platform and install it and utilise the same platforms in different configurations for different positions.

Each platform 811 comprises a support structure 812 which comprises a plurality of spaced apart, substantially parallel supports 818 that extend in a direction that is generally perpendicular to the edge of the floor of the building 814. A deck support portion 820 of each of these supports 818 extends from the edge of the building and beyond the floor of the building 814. A building engagement portion 822 of the supports 818 extends along the floor of the building 814 to brace the support structure 812 in position with respect to the building. The deck support portion 820 is engaged with the building engagement portion 822. In some forms this engagement is by means of welding. In some forms this comprises a full structural weld. The engagement area 824 is configured to create a stepped or dog's leg shape in the support such that each support 818 extends horizontally at the building engagement portion 820, turns to the vertical at the engagement area 824 for the combined width of the support portions 820 and 822 and then extends horizontally from the engagement area into the deck support portion. The engagement area 824 is welded to secure the deck support portion 820 and the building engagement portion 822 in relation to one another.

In some forms in which the deck support portion 820 and building engagement portion 822 are in the form of I-beams, the I-beam is made up of two flanges connected by a web located centrally on the flange. The lower flange of the building engagement portion 822 is welded to the upper flange of the deck support portion 820. The structural weld connects both sides of the I-beam at either edge of the flange.

In some forms in which the deck support portion 820 and building engagement portion 822 are in the form of C-beams, the C-beam is made up of two flanges connected by a web at one end of the flanges. The lower flange of the building engagement portion 822 is welded to the upper flange of the deck support portion 820. The structural weld connects both sides of the C-beam at either edge of the flange.

In some forms a gusset is provided to add strength to the engagement area 824. In some forms the gusset comprises a panel or plurality of panels closing off one end of the beam. In some forms, the engagement area 824 includes one or more flanges or strengthening projections to strengthen the support 818.

In some forms, the engagement area 824 includes one or more flanges or strengthening projections to strengthen the support 818.

The form of the support 818 means that the deck support portions 820 can extend from the floor of the building 814 such that an upper surface of the deck support portion 820 is aligned with or lower than the floor surface while the building engagement portion 822 is raised above the floor surface and in a facing relationship with the floor surface. The deck 816, sheet 817 and the top of support 820 are all level forming a complete level surface of deck 816 which is level with floor 814 or the deck 816 maybe 6*mm* or 8*mm* or 12*mm* above or sitting on the floor 814 or adjacent to floor 814 providing a level surface with floor 814 and deck 816.

The deck 816 comprises a plurality of deck sheets 817 that are supported by the deck support portions 820. The position of the deck support portions 820 mean the deck sheets 817 are therefore level with the floor surface of the building 814. This improves safety and reduces cost of moving items.

In the modular form, the level nature of the deck and the support structure means that multiple platforms can be combined without positioning dangerous raised beams on the deck.

Figure 13:
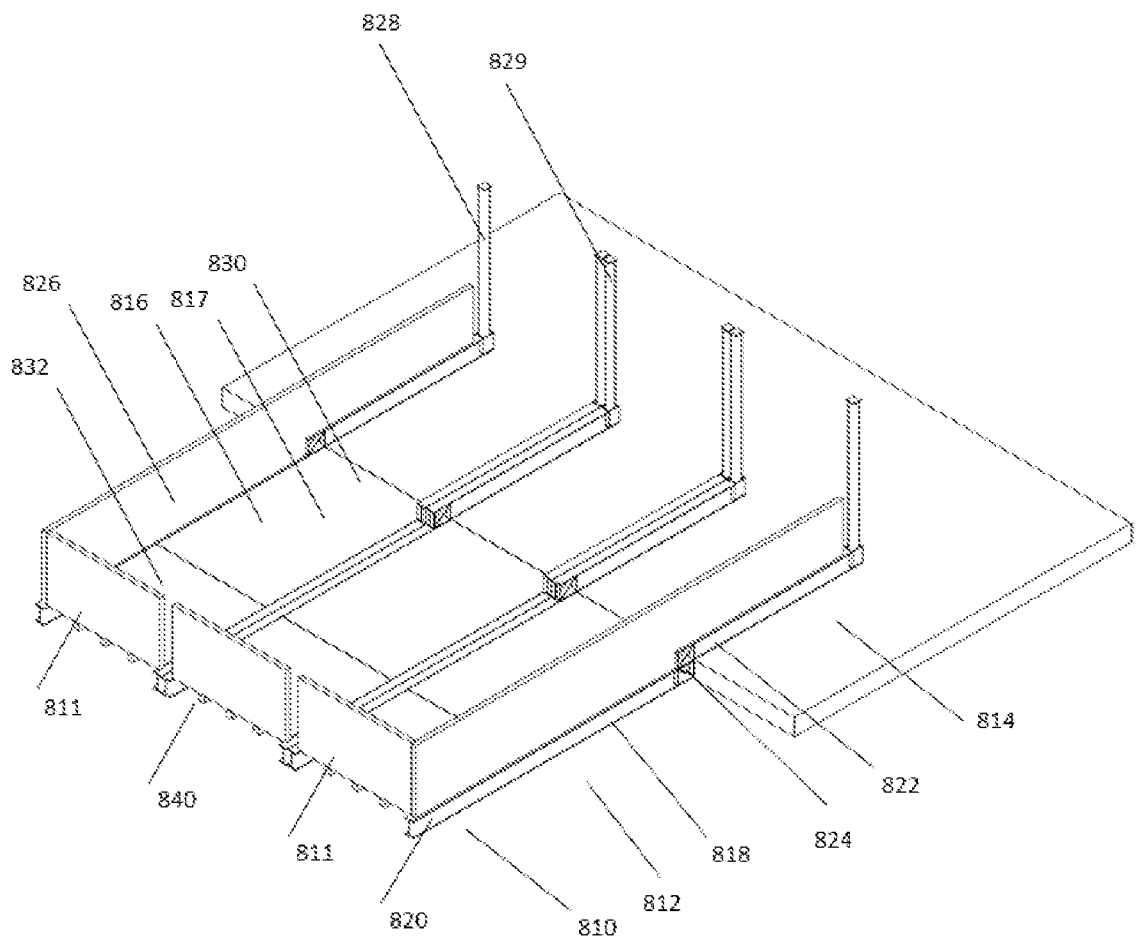
FIG. 13 shows a perspective view of a loading platform of a seventh embodiment of the disclosure.
Figure 16:
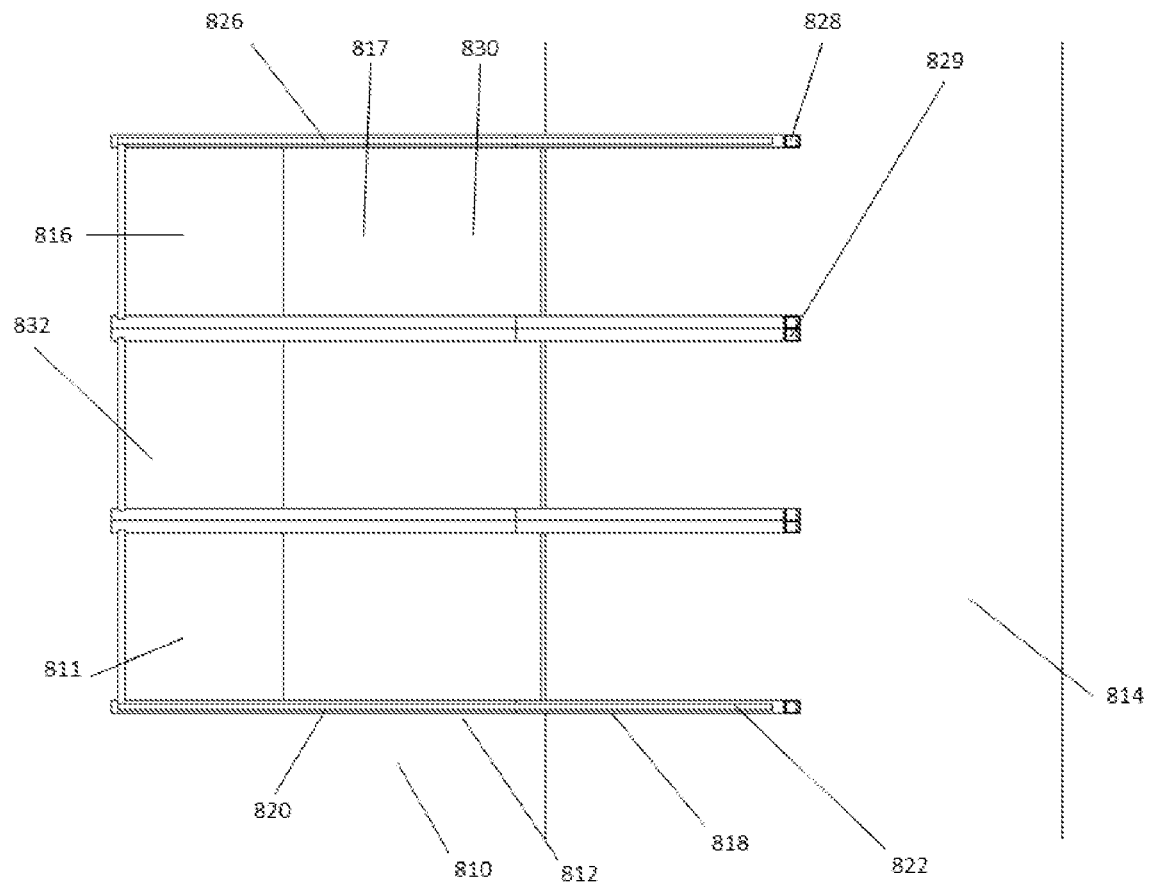
FIG. 16 shows a top view of the loading platform of FIG. 13.
Figure 17:
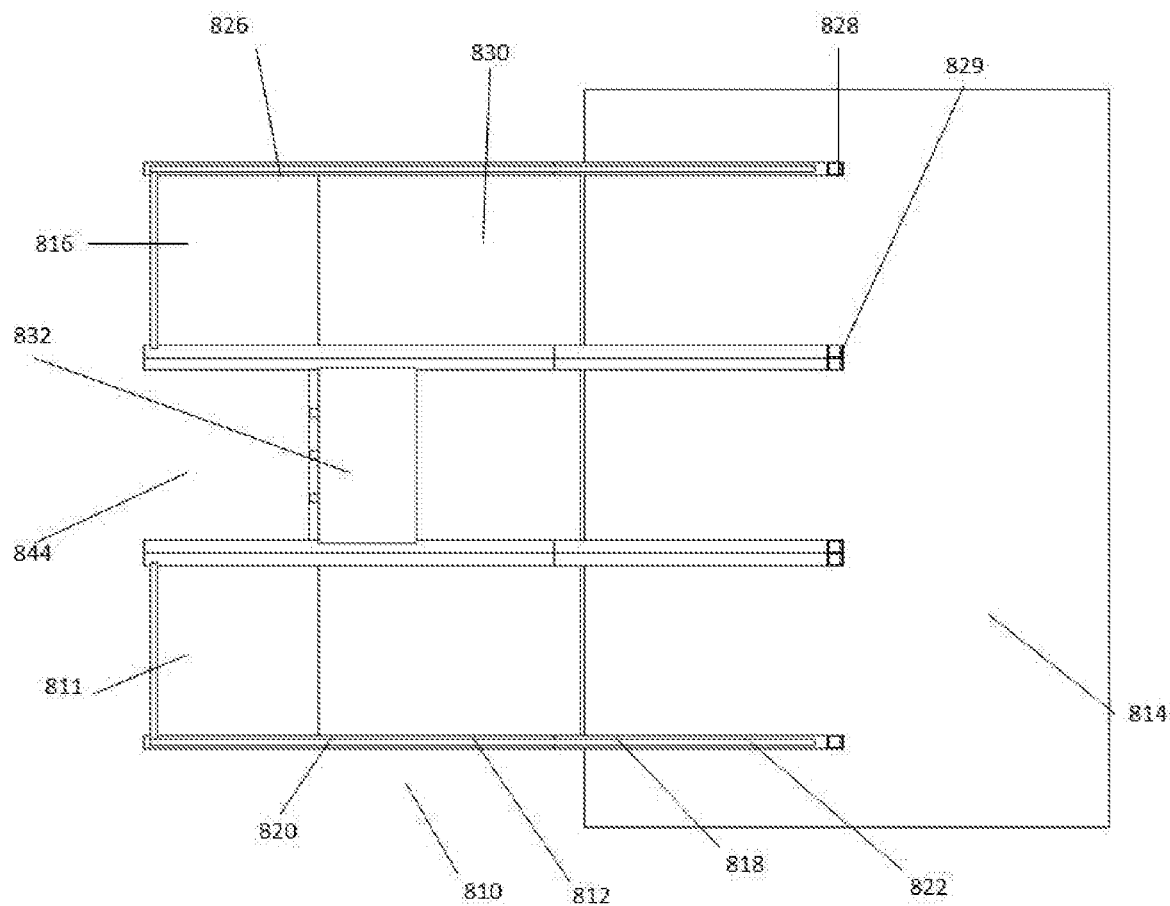
FIG. 17 shows a top view of the loading platform of FIG. 13 in a lifted configuration.
Figure 18:
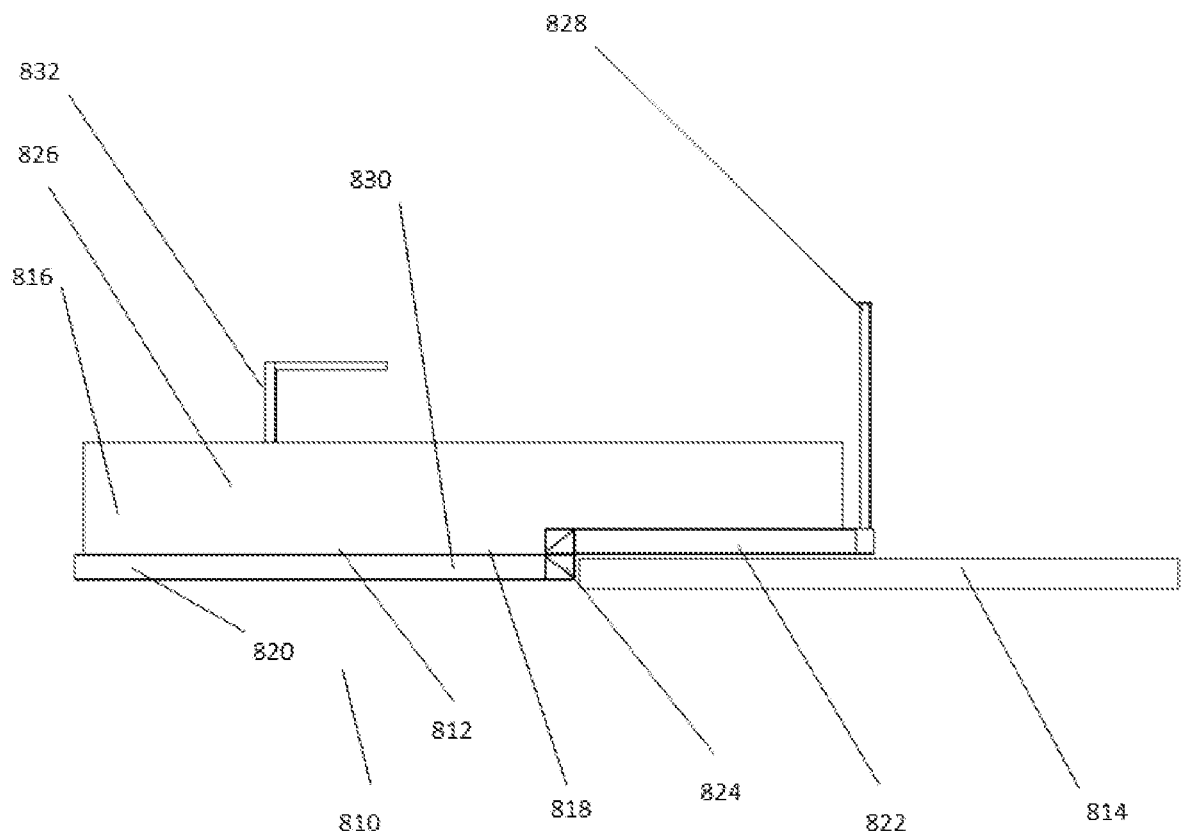
FIG. 18 shows a side view of the loading platform of FIG. 13 in a lifted configuration.
Figure 19:
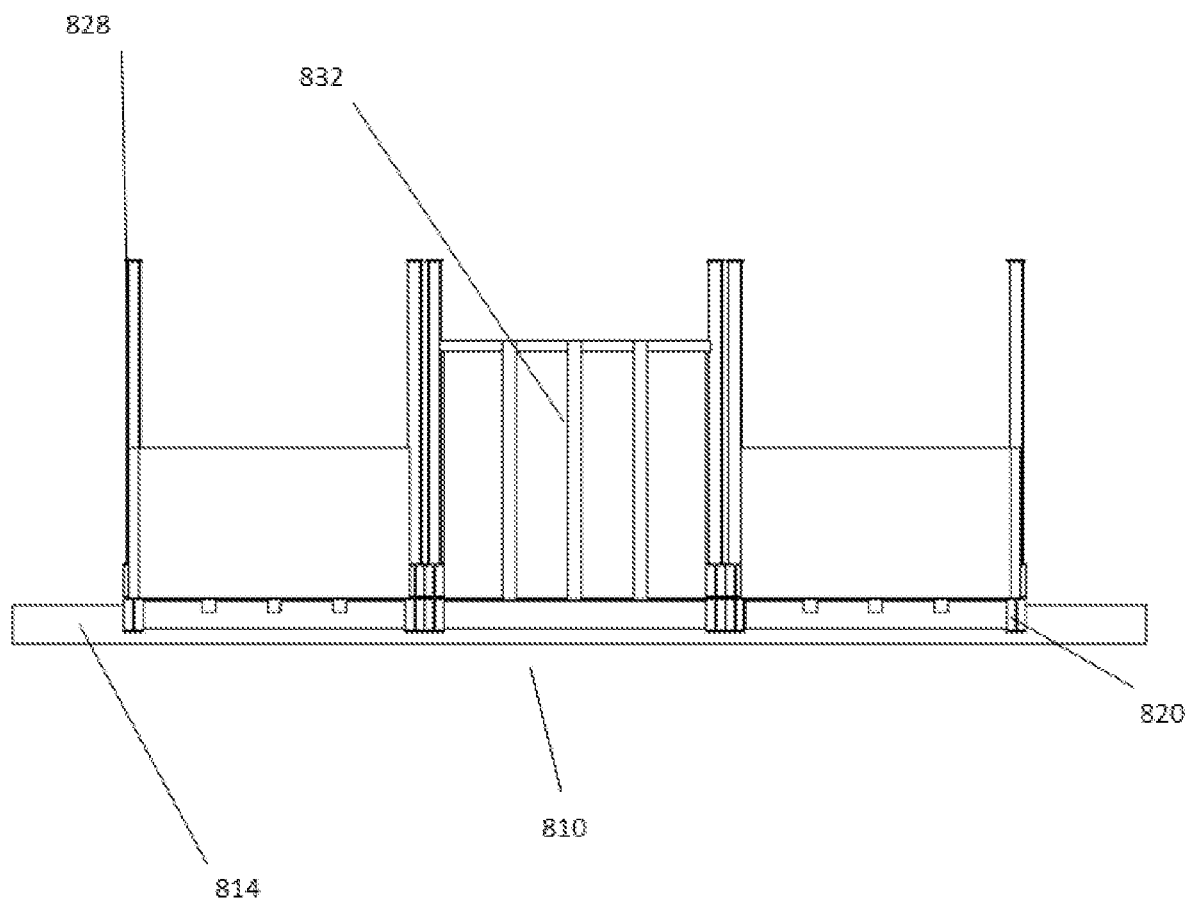
FIG. 19 shows a front view of the loading platform of FIG. 13 in a lifted configuration.

At least one deck 816 and in the illustrated form each deck comprises a fixed deck portion 830 and a moveable deck portion 832. The moveable deck portion is moveable between two configurations. In the first configuration as shown in FIGS. 13 and 16 the moveable deck portions extends outwardly from the fixed deck portions 830. The moveable deck portions 832 are engaged with and level with the fixed deck portions. The fixed deck portions and moveable deck portions form a level deck platform extending the full upper surface area of the deck 716. The limits of the level deck platform define a loading area of the platform.

The moveable deck portions 832 are moveable into a second configuration as best shown in FIGS. 14, 15, 17, 18 and 19. In this configuration any of the moveable deck portions 832 is turned to a vertical orientation such that it is vertical to the fixed deck portion 830. The entire moveable deck portion is rotatable through 90 degrees to the vertical to be in a perpendicular relationship with the fixed deck portion 830.

Figure 14:
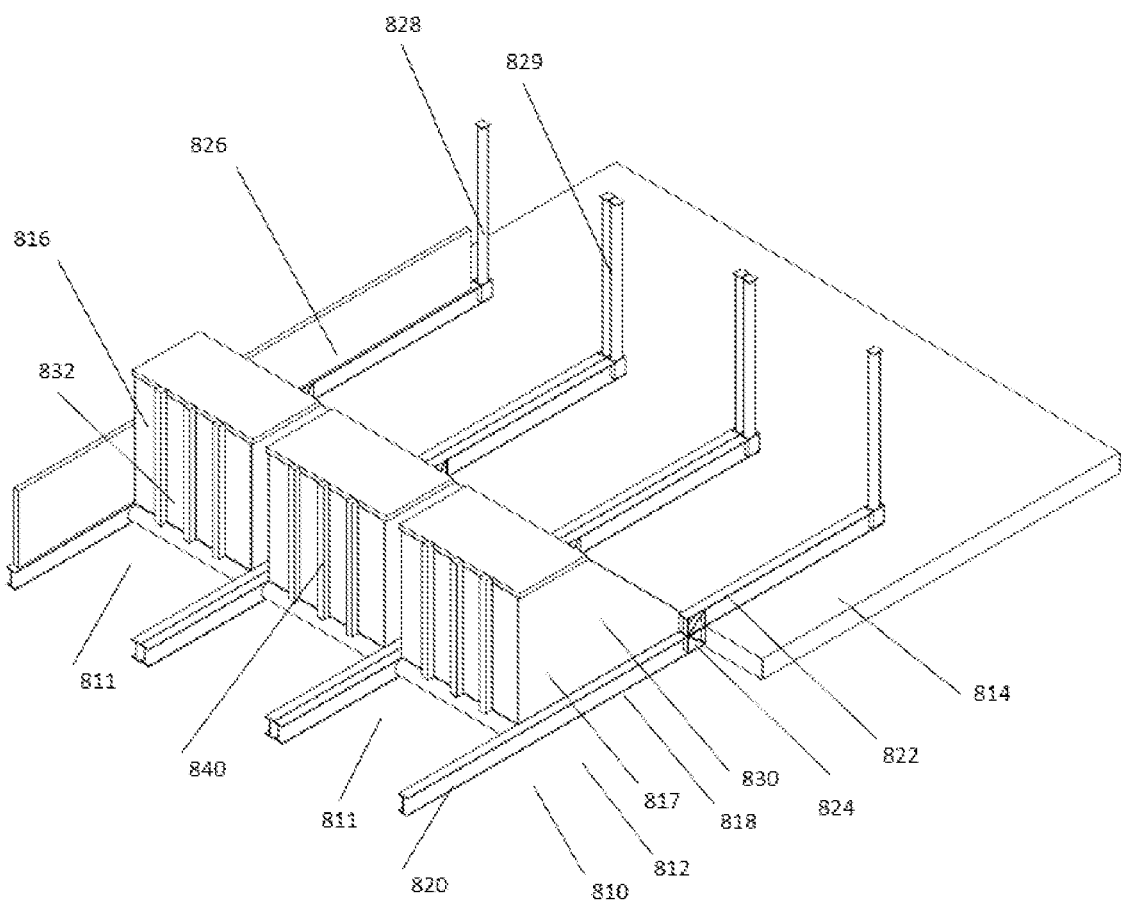
FIG. 14 shows a perspective view of the loading platform of FIG. 13 in a lifted configuration.
Figure 15:
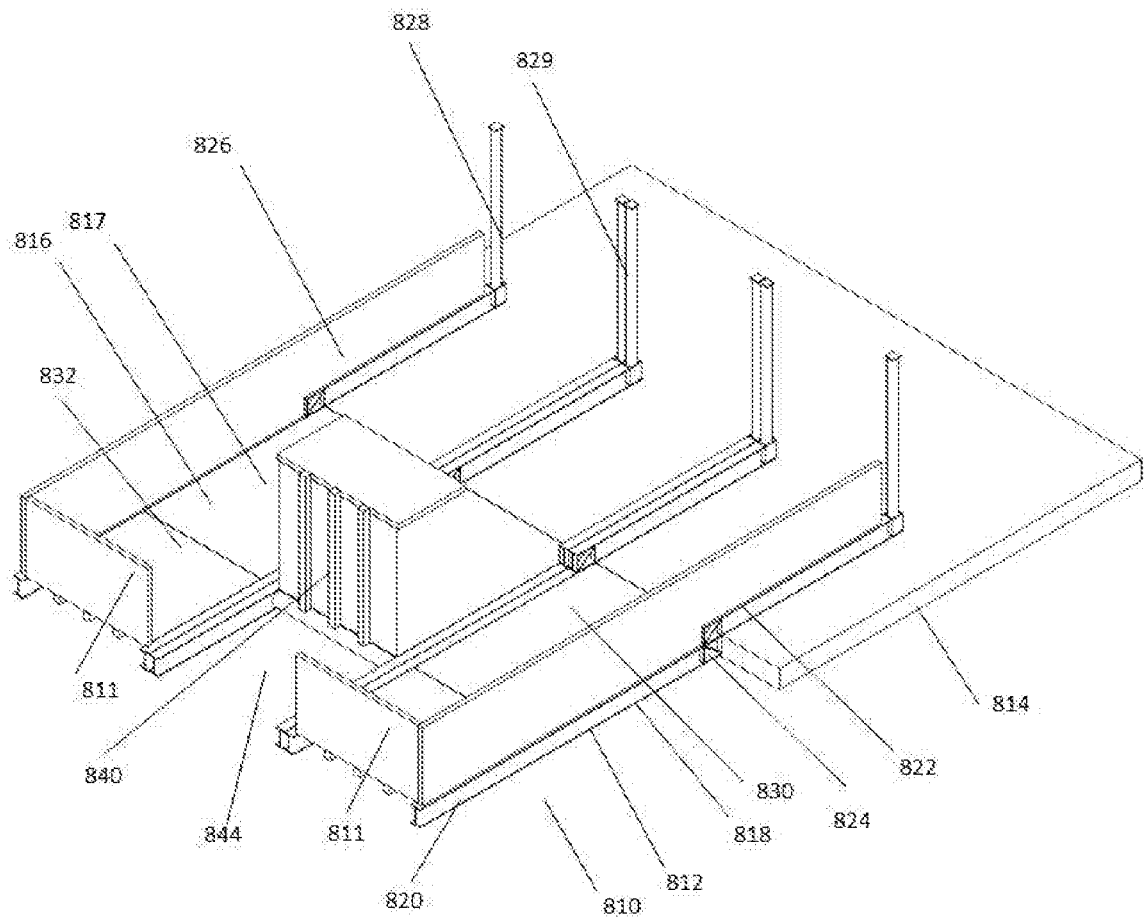
FIG. 15 shows a perspective view of the loading platform of FIG. 13 in a lifted configuration.

As shown in FIG. 14, this may involve turning each moveable deck portion out of alignment with the fixed deck portion 830.

As shown in FIGS. 15, 17, 18 and 19, this may involve turning a single moveable deck portion 832 out of alignment with the fixed deck portion 830 and to the vertical.

In this form, a plurality of deck sheets 817 are interconnected. The deck support portions 820 are located such that the whole loading area of the deck to the edges is level. The deck support portions 818 are located at the level of the floor surface of the building 814 and the deck sheets 817 are located at the same level.

As in the other forms, the movement into the second configuration moves the moveable deck portion 832 out of the loading area and creates an opening in the loading area of the platform 810.

A railing 826 in the form of sheet material extends along the overall edges of the deck 816.

The supports 818 are engaged with the building 814 by means of a plurality of joining elements such as detachable props 828 which engage an end of the building engagement portion 820 furthest to the interior of the building floor and distal from the deck support portion 820. In use the prop 828 extends between the end of the support 818 and the lower surface of the floor above to retain the platform 810 in position. In the illustrated form, two props 828 are utilised at locations 829 where two modular platforms meet.

A framework of struts 840 is fixed (e.g. welded) to the undersides of the deck 816 so as to provide a base structure for the deck.

In use, movement of the moveable deck portion 832 into the second configuration provides an access path through the deck 816 (i.e. through the envelope of the loading area defined by the deck 816) at a portion of its distal edge.

The gap formed in the deck 816 provides an access path 844 sized and shaped such that the access is provided for a crane or hoist device. Thus, the entire platform 810 does not need to be retracted into the building 814, and the resulting structure is able to be lighter whilst being more rigid (because there is no need for a substantial sliding mechanism).

The platform provides the benefit of an extended surface allowing work beyond the edges of the building floor while also maintaining the benefits of a level surface with few impediments to movement. This is provided by having a dog's leg shaped support that turns from the horizontal to the vertical at the edge of the building and back to the horizontal having dropped the level of the support such that the upper surface of the support is at the floor surface.

The platform further provides a simple system for moving a portion of the platform out of the loading area to provide a path for movement of materials or other items between platforms.

Figure 20:
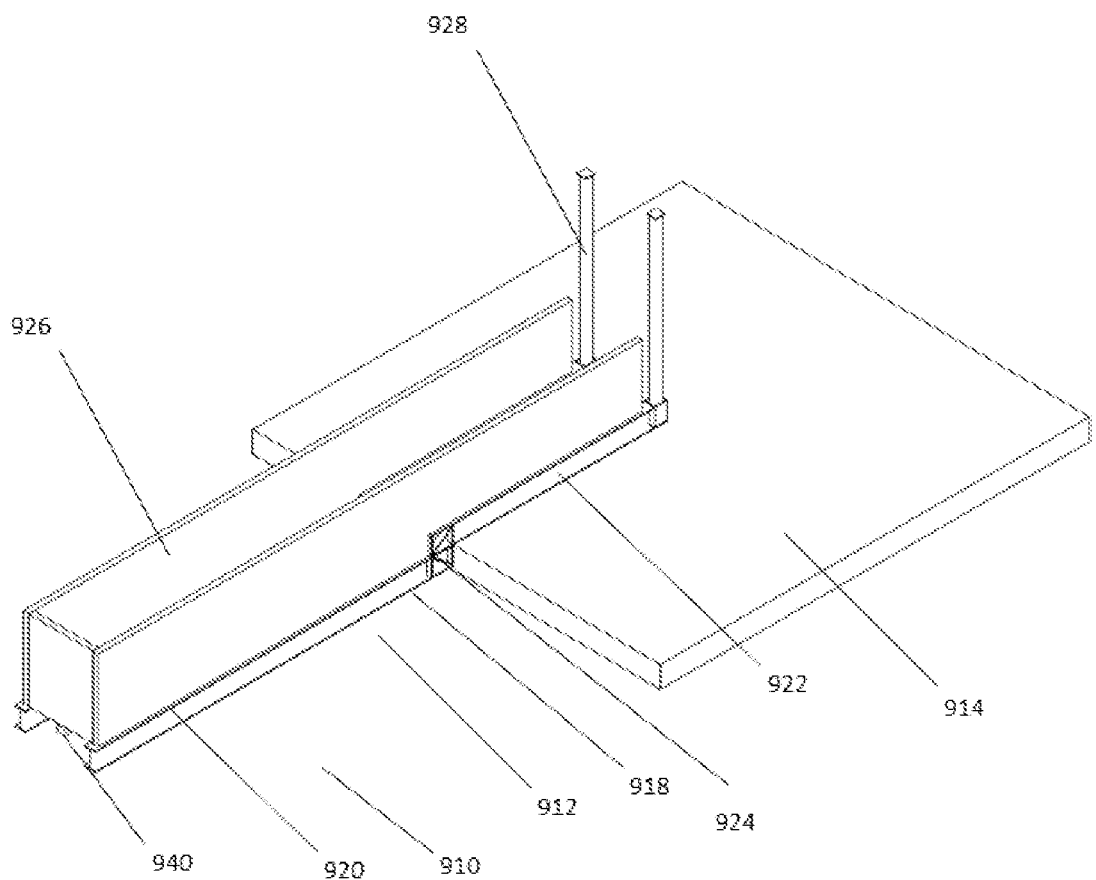
FIG. 20 shows a perspective view of an eighth embodiment of a loading platform.

As shown in FIG. 20, in a further embodiment a narrow platform 910 can be utilised. The platform 910 has a width substantially less than its length.

The support structure 912 comprises two spaced apart, substantially parallel supports 918 that extend in a direction that is generally perpendicular to the edge of the floor of the building 914. A deck support portion 920 of each of these supports 918 extends from the edge of the building and beyond the floor of the building 914. A building engagement portion 922 of the supports 918 extends along the floor of the building 914 to brace the support structure 912 in position with respect to the building. The deck support portion 920 is engaged with the building engagement portion 922. In some forms this engagement is by means of welding. In some forms this comprises a full structural weld. The engagement area 924 is configured to create a stepped or dog's leg shape in the support such that each support 918 extends horizontally at the building engagement portion 920, turns to the vertical at the engagement area 924 for the combined width of the support portions 920 and 922 and then extends horizontally from the engagement area into the deck support portion. The engagement area 924 is welded to secure the deck support portion 920 and the building engagement portion 922 in relation to one another.

In some forms, the engagement area 924 includes one or more flanges or strengthening projections to strengthen the support 918.

The form of the support 918 means that the deck support portions 920 can extend from the floor of the building 914 such that an upper surface of the deck support portion 920 is aligned with or lower than the floor surface while the building engagement portion 922 is raised above the floor surface and in a facing relationship with the floor surface.

The deck 916 is supported by the deck support portions 920. The position of the deck support portions 920 mean the deck 916 is therefore level with the floor surface of the building 914.

A railing 926 in the form of sheet material extends along the overall edges of the deck 916.

The supports 918 are engaged with the building 914 by means of a plurality of joining elements such as detachable props 928 which engage an end of the building engagement portion 920 furthest to the interior of the building floor and distal from the deck support portion 920. In use the prop 928 extends between the end of the support 918 and the lower surface of the floor above to retain the platform 910 in position.

A framework of struts 940 is fixed (e.g. welded) to the undersides of the deck 916 so as to provide a base structure for the deck.

Figure 21:
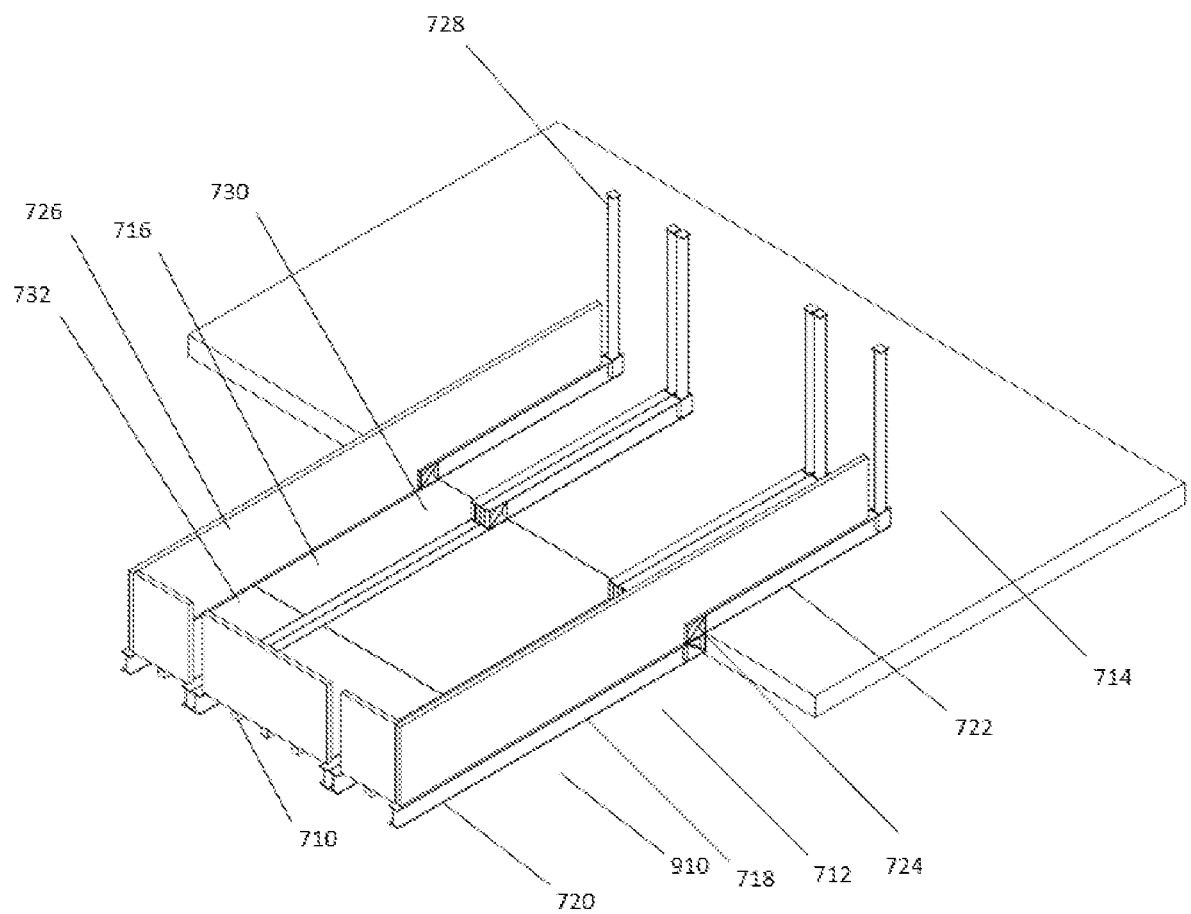
FIG. 21 shows a perspective view of a ninth embodiment of a loading platform.

As shown in FIG. 21, a plurality of narrow platforms 910 and platforms 710 can be used in combination. In the illustrated combination the narrow platforms do not include a moveable deck portion. The platform 710 includes a moveable deck portion 732.

In some forms the beams forming the support structure are I-beams. In some forms the beams forming the support structure are C-beams or C-channels which, when used in a modular structure, meet to simulate the shape of an I-beam. When the C-beams are bolted or otherwise joined together in use they form the structural equivalent of a single I-beam. In some forms they are bolted through the entire length of the channel. This allows support without requiring the extra width of two I-beams. In this form two props need not be used at points where two platforms meet.

Variations and modifications may be made to the parts previously described without departing from the spirit or ambit of the disclosure.

For example the support structure may be fixed to the building in other ways. It may also comprise various arrangements of props and brackets.

The access path may comprise various other shapes and sizes depending on the equipment it is intended to provide access to. The movable portion may similarly take other forms and may be moveable between the first and second configurations using various other mechanisms. Although, in some instances, it may be preferable, in its broadest form it is not necessary that the movable portion retract onto the deck. Instead, the movable portion may e.g. swing out away from the deck, or under the deck (e.g. like a trap door). Alternatively, the movable portion may retract underneath the deck.

The movable portion may be moved by hand, or may be driven by motors, such that a user can remotely move the movable portion between the first and second configurations.

The sidewalls, or portions of the sidewalls, may be formed of flexible material or concertina folding sections that can be moved depending on the position of the movable portion.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A loading platform for use in building construction, the loading platform comprising:
   a support structure adapted to be fixed to a building and extend outwardly from the building; and
   a deck mounted to the support structure such that the deck extends from the building,
   the support structure comprising a building engagement portion and a deck support portion, the deck mounted to an upper surface of the deck support portion, the upper surface of the deck support portion being configured to extend level with or below a floor surface of the building when the building engagement portion is fixed to the building such that the upper surface of the deck extends level with or below the floor of the building wherein the building engagement portion and the deck support portion are engaged with one another at an engagement area configured to create a stepped shape in the support such that the upper surface of the deck support portion is in contact with the lower surface of the deck and the upper surface of the deck extends level with or below the floor of the building.

2. A loading platform as defined in claim 1, wherein the entire deck support portion of the support structure is configured to be located level with or below the floor surface.

3. A loading platform as defined in claim 1, wherein the support structure is configured such that a lower surface of the building engagement portion overlays the floor surface.

4. A loading platform as defined in claim 1, wherein the building support structure is stepped between the building engagement portion and the deck support portion.

5. A loading platform as defined in claim 1, wherein the building engagement portion extends across a floor surface of the building and outwardly of the floor of the building and the deck support portion is affixed to a lower surface of the building engagement portion, that overhangs an edge of the floor of the building.

6. A loading platform as defined in claim 1, the loading platform being provided as a module for a loading platform assembly and configured such that a plurality of loading platforms can be located adjacent one another to form the loading platform assembly.

7. A loading platform as defined in claim 6, wherein when a plurality of loading platforms are positioned adjacent one another, the decks and support structure forms a substantially level deck area extending across each of the plurality of loading platforms.

8. A loading platform as defined in claim 7, the deck area comprising a width dimension and a length dimension that is generally orthogonal to and greater than the width dimension;
   the loading platform being configured such that, in use, the deck area is arranged to extend from the building whilst being supported by the support structure, the deck area being oriented such that the width dimension of the deck area is in the general direction of the extension of the deck.

* * * * *